United States Patent
Mansour et al.

(10) Patent No.: US 7,155,681 B2
(45) Date of Patent: Dec. 26, 2006

(54) PLATFORM-INDEPENDENT DISTRIBUTED USER INTERFACE SERVER ARCHITECTURE

(75) Inventors: Peter M Mansour, Kirkland, WA (US); Chad Arthur Schwitters, Redmond, WA (US)

(73) Assignee: Sproqit Technologies, Inc., Bellevue, WA (US)

( * ) Notice: Subject to any disclaimer, the term of this patent is extended or adjusted under 35 U.S.C. 154(b) by 295 days.

(21) Appl. No.: 09/782,845

(22) Filed: Feb. 14, 2001

(65) Prior Publication Data

US 2002/0109718 A1 Aug. 15, 2002

(51) Int. Cl.
*G06F 3/00* (2006.01)

(52) U.S. Cl. .................. 715/762; 715/765; 715/763; 715/744; 715/764; 715/752

(58) Field of Classification Search ............. 345/752, 345/765, 763, 744, 764, 762; 715/507, 501.1, 715/752, 765, 763, 744, 764, 762; 709/219, 709/217, 218
See application file for complete search history.

(56) References Cited

U.S. PATENT DOCUMENTS 5,818,447 A * 10/1998 Wolf et al. ................. 345/744
6,065,041 A     5/2000 Lum et al.
6,078,322 A     6/2000 Simonoff et al.
6,327,608 B1 * 12/2001 Dillingham ................. 709/203
2002/0152244 A1 * 10/2002 Dean et al. ................. 707/530

FOREIGN PATENT DOCUMENTS

| EP | 0 905 627 A1 | 3/1999 |
| WO | WO 99/63430 | 12/1999 |
| WO | WO 01/18691 A2 | 3/2001 |
| WO | WO 01/18691 A3 | 3/2001 |
| WO | WO 01/75614 A1 | 10/2001 |

* cited by examiner

*Primary Examiner*—Ba Huynh
*Assistant Examiner*—Mylinh Tran
(74) *Attorney, Agent, or Firm*—Dorsey & Whitney LLP

(57) ABSTRACT

A distributed user interface (UI) system includes a client device configured to render a UI for a server-based application. The client device communicates with a UI server over a network such as the Internet. The UI server performs formatting for the UI, which preferably utilizes a number of native UI controls that are available locally at the client device. In this manner, the client device need only be responsible for the actual rendering of the UI. The source data items are downloaded from the UI server to the client device when necessary, and the client device populates the UI with the downloaded source data items. The client device employs a cache to store the source data items locally for easy retrieval.

54 Claims, 21 Drawing Sheets

|!|□|P|FROM | SUBJECT | RECEIVED |
|---|---|---|
| PETER MANSOUR | MEMOS | 1/18/01 |
| CHAD SCHWITTERS | MEMOS | 1/18/01 |
| JOHN DOE | MEETING AGENDA | 1/13/01 |
| MARK TAKAHASHI | DEADLINES | 1/10/01 |
| JANE DOE | CREDIT CARDS | 1/3/01 |
| JANE DOE | WIRELESS APPS | 1/3/01 |
| CUSTOMER SERVICE | INFORMATION | 12/30/00 |
| AUTO REPLY | MEMOS | 12/24/00 |
| JOHN DOE | COMPANY LOGO? | 11/13/00 |

FIG. 4

FROM:      TO:
SUBJECT:

THE QUICK BROWN FOX I

FIG. 5

PLATFORM-INDEPENDENT DISTRIBUTED USER INTERFACE SERVER ARCHITECTURE

CROSS REFERENCE TO RELATED APPLICATIONS

This application is related to U.S. patent application Ser. No. 09/783,660, titled "Platform-Independent Distributed User Interface System Architecture," filed Feb. 14, 2001, and to U.S. patent application Ser. No. 09/783,673, titled "Platform-Independent Distributed User Interface Client Architecture," filed Feb. 14, 2001.

FIELD OF THE INVENTION

The present invention relates generally to a client-server data communication system. More particularly, the present invention relates to a system that utilizes native client user interface features to display data received from a server.

BACKGROUND OF THE INVENTION

The number of users receiving data services via the Internet and wireless data networks continues to grow at a rapid pace. For example, millions of people have traditional access to the Internet and many people use web-capable wireless telephones. In addition, a growing number of people own handheld computers or personal digital assistants (PDAs), many of which are capable of establishing a traditional and/or a wireless connection to the Internet.

At the heart of this technological explosion are the data-capable Internet appliances. These devices encompass a wide range of form factors: web-enabled telephones, smart telephones, PDAs, handheld gaming machines, and other devices. By nature these devices are small, portable, affordable, and offer instant access to valuable data such as personal information manager (PIM) data and email, as well as entertainment such as gaming, music, and streaming video. The combination of a handheld computing device (HCD) and a wireless network connection is extremely intriguing to the end user, offering a substantially higher value proposition than the HCD has ever held before. With this change, longtime benefits such as portability, instant power-up, and long battery life become much more valuable. The appeal of constant connectivity without the inconvenience of carrying and waiting for a laptop computer to start is evident.

In the context of a wirelessly connected HCD, the following advantageous uses come to mind: access to e-mail, access to the Internet, access to calendars and schedules, and collaboration with co-workers. Unfortunately, most HCDs were originally designed to function as personal computer companions or standalone data banks. By shifting the scenario to focus on direct network connectivity, these devices lose the level of processing functionality they originally had when the personal computer provided their interface to the network. Historically there have been to be two approaches to solving the problem of remote data access: (1) client side processing where the user device (a "fat" client) functions as a small computer; and (2) thin clients that operate in conjunction with server side processing.

In order to provide enough functionality to maintain the perceived value of wirelessly connected devices, some solution providers have taken the classic approach of providing the device with more functionality, thus creating a fat client device. For example, some providers add software and features to their platforms and applications to allow end users to connect directly to their email servers, browse web pages, and download and play streaming media files. The result is an effort to create a product that maps to the broadest segment of the market. However, due to practical technology requirements, vendors are often forced to add more and more resources to the client devices. Faster processors and additional memory not only add cost to the devices, but the additional power requirements call for larger batteries which compromise both the size and weight of the device.

Three variables that determine practicality to the end user are portability, affordability, and value. Fat client devices, while benefiting from additional functionality, usually suffer a decrease in portability, affordability, product practicality, and mainstream adoption. In addition, a closer look at the functionality actually being delivered by such fat client devices reveals further limitations. For example, although such devices can usually access simple POP3 and IMAP4 email accounts, they may not be sophisticated enough to negotiate corporate firewalls or communicate with proprietary servers (e.g., MICROSOFT EXCHANGE™ and LOTUS DOMINO™) to access email or PIM data. As a result, corporate end users must maintain separate email accounts for their wireless HCDs and will have no access to corporate server-based PIM data.

Thin client architectures can be segmented into three typical categories: web interfaces, virtual machines, and thin clients. Of the three, the stateless web interface category seems to be garnering the most attention with the rising popularity of the wireless application protocol (WAP) among wireless carriers and phone manufacturers. However, whether the format is WAP, hypertext markup language (HTML), or any other extensible markup language (XML) derivative, the basic concept remains the same: employ a stateless browser-based user interface to interact with a server-based application that will handle 100% of the application functionality and some of the formatting work. The result (at least for WAP browser implementations) is a client that is small and simple enough to fit on a wide range of inexpensive, low-end devices. By moving in this direction, portability and affordability are addressed, while value is derived from powerful server-based applications. However, although this type of architecture offers some practicality to the end user, WAP phones and other WAP-enabled devices are often limited from a user interface standpoint.

With the wide-ranging proliferation of the Internet, so-called "web-based applications" have become highly prevalent. Popular sites (some examples may be HOTMAIL™, YAHOO! MAIL™, YAHOO! CALENDAR™, and MICROSOFT INVESTOR™) provide users with a web interface to the kinds of applications that were previously only available as client side software. At one level, the term "application" seems accurate, but the usage model of a classic client-side application and a web-based application differ considerably. In contrast to the client-side model, web-based applications are stateless and non-interactive. For example, every click of the end user's mouse, selection on a menu, or update requires a reconnection to the server and a refresh of the web page. Even over the fastest Internet connections the user experience on a web-based application is arduous when compared to the persistent, interactive nature of client-side applications. Another drawback of this approach is that web-based email applications require their users to manage yet another email address. These approaches cannot function in the true sense of a desktop application, i.e., as a tool to reach individual source data instead of a service.

Some existing solution providers offer a web-based system that allows users to access their corporate data via the Internet. However, these providers require that the corporation set up a virtual private network (VPN) between the corporation's data center and the provider's service center. This may seem like a plausible enterprise solution, but the individual end user is still left without a viable alternative to traveling with a laptop computer. Furthermore, many enterprise information systems (IS) professionals are slow to adopt new technology before the functionality and demand has been generated by the people they support. End user demand will not be generated unless the specific scenario has been addressed, thus resulting in a self-perpetuating cycle.

As the Internet started gaining momentum and the static and stateless nature of web pages became apparent, new technologies such as JAVA™, ACTIVEX™, and dynamic hypertext markup language (DHTML) were developed. The growing popularity of wireless HCDs and the inadequacies of the static web view will again prompt competition related to the next development platform in the wireless market.

The key element to the Java architecture is the virtual machine. While this concept is sound and in many cases quite effective, there are several limitations that may be a hindrance when considering wireless HCDs. A virtual machine establishes a layer between the operating system (OS) and the application. Each virtual machine is compiled for the various target operating systems, thus eliminating the need to compile the individual applications. The applications simply write to the virtual machine layer, which then translates for the OS layer. The virtual machine functions as an OS within an OS—hence the term "virtual" machine.

The level of separation from the OS comes at a significant performance overhead. Rather than running the application directly, the virtual machine must first run the application and then map its commands into calls that the underlying OS can understand. In order for the virtual machine to be a viable cross-platform solution it must also cater to the least common denominator of devices, thereby limiting its functionality for higher-end platforms. Additionally, most virtual machine implementations download the entire application onto the device every time the user accesses the application, which results in long delays over a slow or inconsistent wireless connection.

An initial response to JAVA™ was ACTIVEX™, and while that solution is very effective in certain scenarios, the lack of platform independence may prove to be its downfall. A recent response to JAVA™ is DHTML, which incorporates client-side scripting in conjunction with HTML to provide a user experience that is far more interactive than plain HTML while retaining platform independence. However, at one level, DHTML is very similar in concept to a virtual machine. Rather than having an actual virtual machine, DHTML uses scripts and snippets of code in much the same way a JAVA™ virtual machine does. In this regard, the browser functions as a layer between the application and the OS, and therefore suffers from many of the same limitations as a virtual machine.

Unlike most of the so-called "thin client" technologies discussed herein, ACTIVEX™ leverages the OS and platform directly, making it a powerful solution for "web-accessed" (as opposed to "web-based") applications. However, because of this, ACTIVEX™ is OS-dependent and processor-dependent, making it a poor solution for the HCD space where multiple OS and processor configurations abound. Furthermore, ACTIVEX™ is in some ways a return to the fat client concept of installing client-side software for local processing.

With the increase in network bandwidth, one of the oldest client-server architectures is making a resurgence. Solutions such as CITRIX™, X-WINDOWS™, WINDOWS TERMINAL SERVER™, and PC ANYWHERE™ are growing in popularity as corporate IS professionals scramble to lower total cost of ownership. All of these solutions employ a thin client that can be ported to multiple platforms, and provide the user with a full graphical representation of their applications running on a remote server.

By using this type of arrangement, corporations may employ a system where all of their users access applications from a single WINDOWS 2000™ server through simple clients (such as WINDOWS CE™ based terminals) located on their desktops. The advantage to the corporation is that this system allows multiple users to share resources with a single point of administration, making the entire system easier to support. The downside is that it also presents a centralized point of failure.

Unfortunately, this model is heavy and inefficient over the communication link. Every keystroke and user action must be transmitted to the server and returned to the client before the user can see it registered on the screen. Furthermore, in order present this "window" to the server, large bitmaps are transmitted between the server and the client, which requires significant bandwidth.

For the most part, these types of systems are deployed within a high speed local area network (LAN) environment, so these issues do not affect the user; however, when considered in a wireless HCD scenario, inconsistent lower-bandwidth connections would make a terminal server deployment virtually unusable. Furthermore, because these terminals simply offer a view to applications running on a server, the user interface usually does not fit the small screen sizes of HCDs.

Therefore, although the value of a terminal server architecture is evident in a desktop LAN environment, it does not scale well to smaller, wirelessly connected devices.

BRIEF SUMMARY OF THE INVENTION

A preferred embodiment of the present invention provides a data communication architecture that exhibits the following attributes: a relatively thin client for reduced client-side resource demands; an interactive end user experience with persistent state; client platform independence; leveraging the strengths of the particular client platform; and ability to function well over an inconsistent, lower-bandwidth connection. A distributed user interface (UI) architecture according to the present invention can specifically address the wireless HCD scenario. The architecture provides a persistent, interactive interface that leverages the client's resident OS user interface to create a look and feel that is consistent with the rest of the device, regardless of which platform is being used to access the server-side application. The result is a semi-dumb client that is actually smaller in size than most "dumb" thin clients.

The distributed UI architecture maintains or emulates a persistent state connection with the server that functions as a terminal session. The main difference between the distributed architecture and terminal server applications is that the distributed architecture only transmits data and a brief description of how to display it (as determined by the server, based on the client's capabilities) between the server and client. The client side software, using the native GUI controls, produces the UI elements on the client, thereby leveraging the advantages that those controls may offer. This greatly reduces the total amount of information that must be transmitted, while making the display of the application data much more appropriate for the client device.

The result is that there is no need to "round-trip" every keystroke, since such inputs can be produced using client-side controls. Data can then be transmitted in bundles that make more efficient use of each transmitted data packet. Furthermore, on some complex platforms such as WINDOWS™/WINDOWS CE™, a number of controls are relatively rich in features. For example, the list view controls on these operating systems allow users to change column width and scroll through the list using the scroll bars. In the preferred embodiment, the distributed UI architecture separates the UI from the data, thus allowing the client to take advantage of these features without needing assistance from the server.

The above and other aspects of the present invention may be carried out in one form by a data processing method carried out in the context of a client-server architecture. The method involves a client device describing its UI capabilities to a UI server, which determines how to configure the UI elements based on the received UI capabilities. The UI server provides a UI form definition to the client device, which renders the UI according to the form definition and populates the UI with data items received from the UI server.

BRIEF DESCRIPTION OF THE DRAWINGS

A more complete understanding of the present invention may be derived by referring to the detailed description and claims when considered in conjunction with the following Figures, wherein like reference numbers refer to similar elements throughout the Figures.

FIG. 4 is an illustration of a list view control associated with the UI shown in FIG. 3;

FIG. 5 is an illustration of a text edit control associated with the UI shown in FIG. 3;

DETAILED DESCRIPTION OF A PREFERRED EMBODIMENT

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in conjunction with any number of data transmission protocols, server-based end user applications, and client devices, and that the system described herein is merely one exemplary application for the invention.

It should be appreciated that the particular implementations shown and described herein are illustrative of the invention and its best mode and are not intended to otherwise limit the scope of the invention in any way. Indeed, for the sake of brevity, conventional techniques for data processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical embodiment.

System Overview

Figure 1:
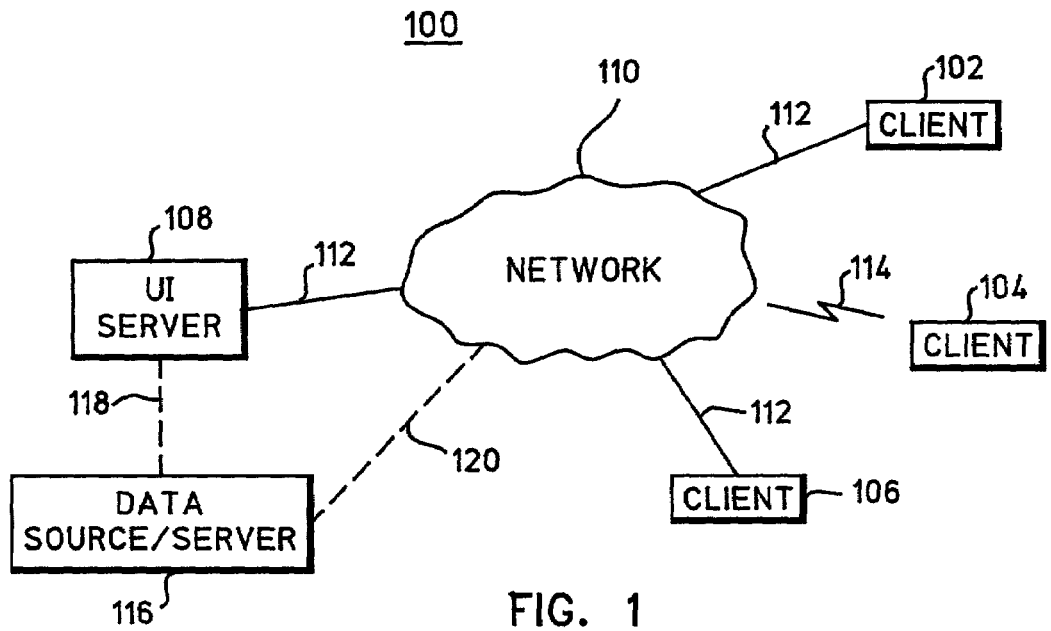
FIG. 1 is a schematic representation of a network deployment of a distributed user interface (UI) system.

The techniques of the present invention are preferably carried out in the context of a network data communication system. Accordingly, FIG. 1 is a schematic representation of a distributed user interface (UI) system 100 in which the techniques of the present invention may be implemented. System 100 is suitably configured to deliver information, data, control commands, and the like, from at least one server device (or system) to any number of remote end user client devices. System 100 is depicted in a generalized manner to reflect its flexible nature and ability to cooperate with any number of different communication systems, service providers, and end user devices. Although this description focuses on the processing and presentation of email data, PIM data, and "office management" data such as calendars, notes, tasks, and contact lists, the techniques of the present invention are not so limited. Indeed, the concepts described herein may be equivalently applied to the processing, delivery, and/or presentation of any suitable data format, including, but not limited to, still images, plain text, styled typography, word processor documents, spreadsheets, digital media, or any other type of information that can be transmitted via a data communication network.

System 100 may include any number of client presentation devices 102, 104, 106 that communicate with at least one UI server 108. In a typical deployment, UI server 108 is implemented in a desktop or other personal computer system. In such a deployment, an individual end user maintains the UI server 108 and each of the client devices 102, 104, 106. Alternatively, UI server 108 can be implemented as any number of scalable components in a larger enterprise network environment. In this respect, a scalable enterprise solution may be configured to execute a number of network-based end user applications while concurrently supporting any number of different end users and any number of different client device platforms. In yet another deployment, a single end user with a single client device may communicate with a plurality of different UI servers representing different services, applications, or the like. For example, one client device may be supported by a desktop UI server, a UI server maintained by a service provider, a UI server maintained by an entertainment service, and the like. For the sake of simplicity and brevity, only a desktop UI server 108 is described in detail below. However, because the features and concepts of a desktop server can be equivalently applied in the context of a scalable or network-based server, the actual number of server hardware devices utilized in the system 100 may vary depending upon the particular requirements and/or specifications of the system.

As used herein, a "client device" or a "presentation device" is any device or combination of devices capable of providing information to an end user of distributed UI system 100. For example, a client device 102, 104, 106 may be a personal computer, a television monitor, an Internet-ready console, a wireless telephone, a personal digital assistant (PDA), a home appliance, a component in an automobile, a video game console, or the like. The client devices may be configured in accordance with any number of conventional platforms, while using various known operating systems (OSs). For example, the client device could be a HANDSPRING VISOR™ running the Palm OS™, a POCKET PC™ running the WINDOWS CE OS™, a laptop computer running the WINDOWS 2000 OS™, a smartphone running a custom OEM-supplied OS, or a specialized data device built with a commercially available RTOS such as Wind River's pSos. In practice, system 100 is particularly suited for use with wireless client devices, since it can handle the bandwidth limitations and inconsistent connections inherent in current wide-area wireless networks much better than existing alternatives. FIG. 1 depicts client device 104 as a wireless device or system.

In accordance with the preferred embodiment, the client devices communicate with UI server 108 via a network 110, e.g., a local area network (LAN) a wide area network (WAN), the Internet, or the like. Although not shown in FIG. 1, network 110 may include any number of cooperating wireless and/or wired network elements, e.g., switches, routers, hubs, wireless base stations, gateways, and the like. It should be appreciated that the present invention need not utilize network 110, e.g., any number of client devices can be connected (directly or wirelessly) to UI server 108. In the preferred embodiment, network 110 is the Internet and each of the individual client devices is configured to establish connectivity with the Internet using conventional application programs and conventional data communication protocols. For example, each client device may be configured to connect to the Internet via an internet service provider (ISP) (not shown in FIG. 1).

In a practical embodiment, client devices 102, 104, 106 and UI server 108 are connected to network 110 through various communication links 112, 114. As used herein, a "communication link" may refer to the medium or channel of communication, in addition to the protocol used to carry out communication over the link. In general, a communication link may include, but is not limited to, a telephone line, a modem connection, an Internet connection, an Integrated Services Digital Network (ISDN) connection, an Asynchronous Transfer Mode (ATM) connection, a frame relay connection, an Ethernet connection, a Gigabit Ethernet connection, a Fibre Channel connection, a coaxial connection, a fiber optic connection, satellite connections (e.g., Digital Satellite Services), wireless connections, radio frequency (RF) connections, electromagnetic links, two-way paging connections, and combinations thereof.

Communication links 112, 114 may be suitably configured in accordance with the particular communication technologies and/or data transmission protocols associated with the given client device. For example, although a communication link 112, 114 preferably utilizes broadband data transmission techniques and/or the TCP/IP suite of protocols, the link could employ NetBIOS, NetBEUI, data link control (DLC), APPLETALK™, or a combination thereof. Communication links 112, 114 may be established for continuous communication and data updating or for intermittent communication, depending upon the infrastructure.

The UI server 108 preferably includes and/or communicates with one or more data sources or data servers 116, which may be configured in accordance with conventional techniques. As used herein, the data server 116 manages source data items that can be delivered to the user of the client devices. In a practical distributed UI system 100, data server 116 may manage the delivery of email, documents, PIM data, and/or any other type of data to and from the client devices. For example, the data server 116 may be realized as local, personal storage such as a MICROSOFT OUTLOOK™ ".pst" file on the same computer as UI server 108, or as a MICROSOFT EXCHANGE SERVER™, a LOTUS DOMINO SERVER™, a POP3 server, an IMAP server, or the like. A given data server 116 may be integral to UI server 108, it may be a distinct component maintained at the service site associated with UI server 108, or it may be maintained by a third party unrelated to the entity responsible for maintaining UI server 108. Accordingly, data server 116 may be configured to communicate with UI server 108 over a direct communication link 118 and/or via network 110 using an indirect communication link 120.

A "server" is often defined as a computing device or system configured to perform any number of functions and operations associated with the management, processing, retrieval, and/or delivery of data, particularly in a network environment. Alternatively, a "server" may refer to software that performs such processes, methods, and/or techniques. As used herein, "UI server" generally refers to a computing architecture that processes data and defines display formats for the client-side UI, while executing a number of server-based applications accessed by the client devices. As in most commercially available general purpose servers, a practical UI server may be configured to run on any suitable operating system such as UNIX™, LINUX™, the APPLE MACINTOSH OS™, or any variant of MICROSOFT WIN- DOWS™, and it may employ any number of microprocessor devices, e.g., the PENTIUM™ family of processors by INTEL™ or the processor devices commercially available from ADVANCED MICRO DEVICES™, IBM™, SUN MICROSYSTEMS™, or MOTOROLA™.

The server processors communicate with system memory (e.g., a suitable amount of random access memory), and an appropriate amount of storage or "permanent" memory. The permanent memory may include one or more hard disks, floppy disks, CD-ROM, DVD-ROM, magnetic tape, removable media, solid state memory devices, or combinations thereof. In accordance with known techniques, the operating system programs and the server application programs reside in the permanent memory and portions thereof may be loaded into the system memory during operation. In accordance with the practices of persons skilled in the art of computer programming, the present invention is described below with reference to symbolic representations of operations that may be performed by the UI server 108 or the client device. Such operations are sometimes referred to as being computer-executed. It will be appreciated that operations that are symbolically represented include the manipulation by the various microprocessor devices of electrical signals representing data bits at memory locations in the system memory, as well as other processing of signals. The memory locations where data bits are maintained are physical locations that have particular electrical, magnetic, optical, or organic properties corresponding to the data bits.

When implemented in software, various elements of the present invention (which may reside at the client devices or at the UI server 108) are essentially the code segments that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Figure 2:
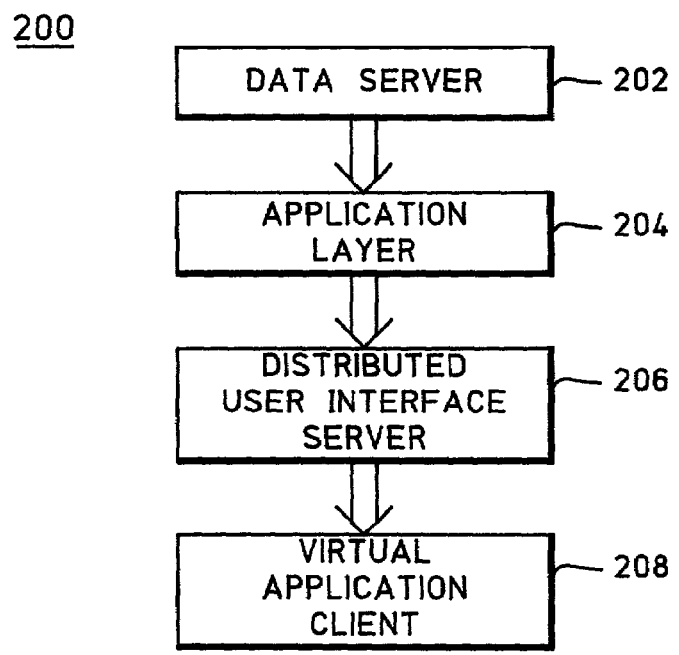
FIG. 2 is a high-level schematic representation of a typical implementation of a distributed UI system.

FIG. 2 is a high-level schematic representation of a typical implementation of a distributed UI system 200 according to the present invention. As shown in FIG. 2, a suitable data server 202 (as described above in connection with data server 116) transfers source data items to an application layer 204 associated with one or more server-based applications. In a practical implementation, the characteristics of the source data items may be dictated by the particular application. For example, a source data item may represent a text message, an email address, a contact list, a to-do item, an appointment, a digital media clip, a file of any format such as a bitmap, a word processor document, a spreadsheet document, or any other type of data that is commonly displayed by a personal computer.

The application layer 204 handles the source data items and communicates with a UI server 206, which may be located on the same or a different computer. As described above, UI server 206 cooperates with the server-based applications such that the bulk of the UI rendering is performed by the client devices, while leaving UI layout, raw data processing, and communication of the data to the UI server 206. In this respect, UI server 206 communicates with a client device 208, thus resulting in a "virtual application client" device 208. As described in more detail below, the client devices utilize cached information to create an application facade. The client platform interprets and handles this application facade in the same manner as any other application. The result is an end user experience similar to that of a fat client, with much of the value and computing power associated with terminal server solutions.

Example Email Application

Figure 3:
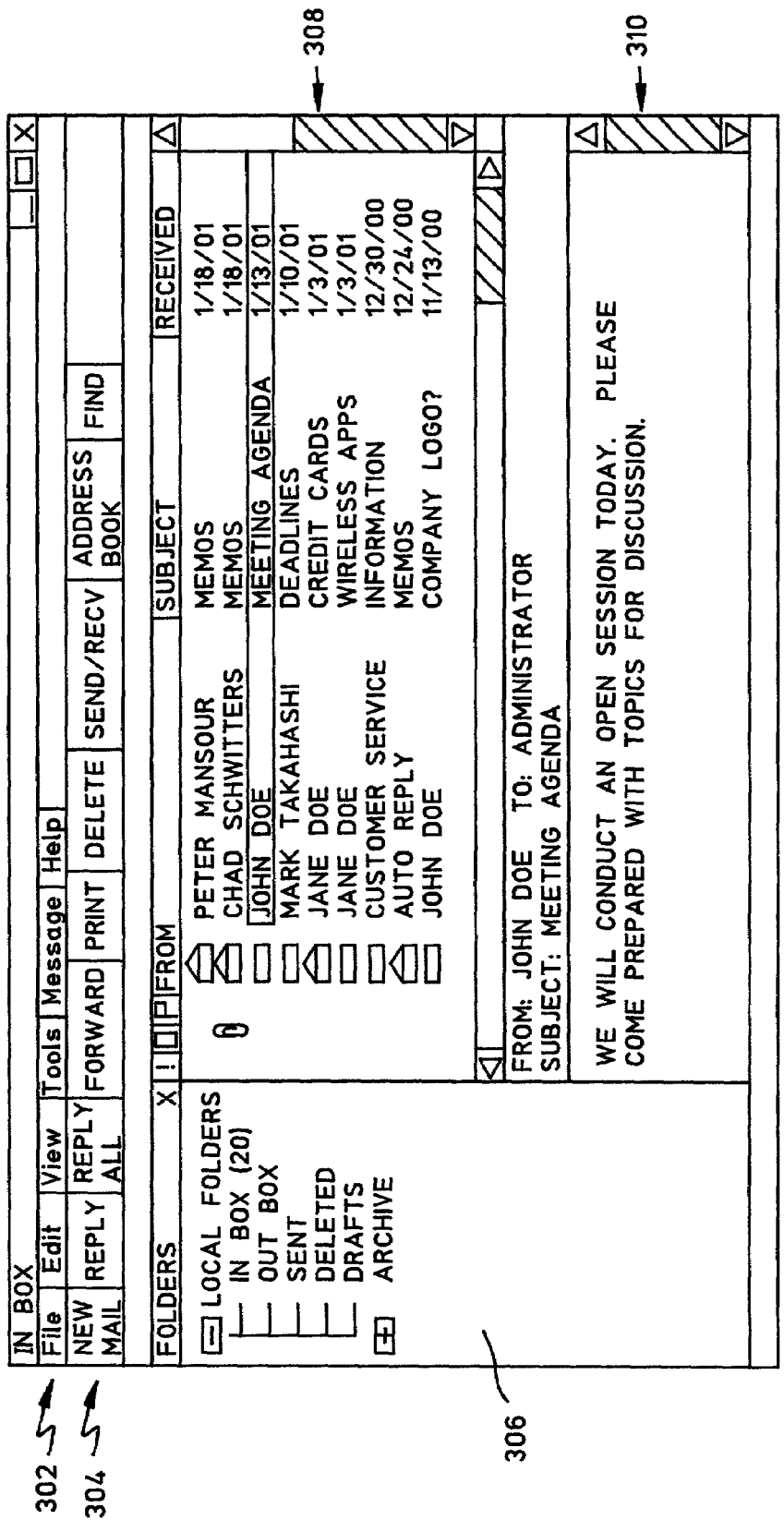
FIG. 3 is an illustration of a user interface associated with an email application supported by a distributed UI system.

For the sake of illustration, the techniques of the present invention are explained herein in the context of an existing desktop email application. Of course, the distributed UI system may (and preferably does) support any number of alternate and/or additional applications. FIG. 3 is an illustration of an example UI 300 associated with a desktop email application. Although not a requirement of the present invention, the UI 300 may utilize UI components, controls, icons, and features that are utilized by standard or commercially available applications. For example, UI 300 may be an example of MICROSOFT'S OUTLOOK™, MICROSOFT'S OUTLOOK EXPRESS™, NOVELL'S GROUPWISE™, or the like.

The overall appearance of UI 300 is preferably comprised of a number of individual UI control elements. As used herein, a "UI control" or a "control element" refers to a unit object of the UI that is provided by the client device OS (i.e., a native UI control) or some other application resident at the client device. A distributed UI system may also employ "custom" UI controls that are specific to certain server-based applications and/or specific to certain client platforms. Applications can avoid excessive coding and processing by leveraging these provided controls. A control allows the client end user to display, enter, modify, manipulate, and/or view data, and to initiate commands and actions for execution by the application. In a practical system, each client platform can have its own list of native UI controls, e.g., buttons, scrollbars, editing features, menus, list boxes, list views, single-line edit areas, multi-line edit areas, labels, and image tools. For example, UI 300 includes a row of menu controls 302, a row of button controls 304, a tree view control 306, a list view control 308, and a text edit control 310.

The distributed UI system employs UI forms that represent the different types of application UIs handled by the system. As used herein, a "UI form" is a description of the layout of the client device display at any given moment. A UI form definition specifies a list of controls, the respective locations of the controls as rendered on the client device display screen, event scripts, data sources, and possibly other characteristics. A UI form preferably does not include the user's data that is to be displayed by the UI controls, but it may specify where a given control can retrieve source data items (e.g., a pointer to a memory location at the client device), and/or which event scripts are executed in response to the activation of certain controls. In a practical system, the UI server maintains a list of different UI form definitions corresponding to the particular client device platform and particular screen shots of the server-based applications accessed by the client devices. In addition, the client device may save cached copies of these UI form definitions (the UI server preferably sends the UI form definitions to the client device as needed).

FIG. 4 is an illustration of a list view control 400 associated with the UI 300 shown in FIG. 3. The list view control 400 can list a number of listed entries, e.g., email messages, associated with the email application. The list view control has several advanced features that can be leveraged for client-side data manipulation, rather than relying completely on the UI server, as is the case with known terminal server implementations. These features include the ability to resize the columns and scroll using a scrollbar 402. In a traditional desktop or LAN environment, an end user can simply manipulate a scrollbar to view the listings. In contrast, the distributed UI system is suitably configured to maintain a limited number of listings at the client device. As the end user scrolls up or down past a certain threshold, the client device will request additional listings from the UI server, thus preserving bandwidth and client memory space. This "virtual" data scheme can also apply to more than just listview data. For example, this feature may be utilized to manipulate any type of data, e.g., text, bitmaps, etc.

FIG. 5 is an illustration of a text edit control 500 associated with UI 300 shown in FIG. 3. (FIG. 5 also contains various label controls (From, To, and Subject) and "invisible" text edit controls associated with the labeled fields; these controls are located in the "header" area above the text edit control 500). The text edit control 500 may be generated and/or manipulated while the end user composes a new email or views a received email. The text edit control 500 may utilize multi-line edit (MLE) features to accommodate text wrapping. In practice, the text edit control may only display a portion of a text message while other portions may reside in the client cache memory or at the UI server. If end user manipulation requires the display of additional text, additional portions of the text message may be retrieved from the client cache or requested from the UI server. Upon completion of a new email message, the contents of the text edit control 500 are saved and processed for subsequent transmission to the UI server (described below).

Figure 6:
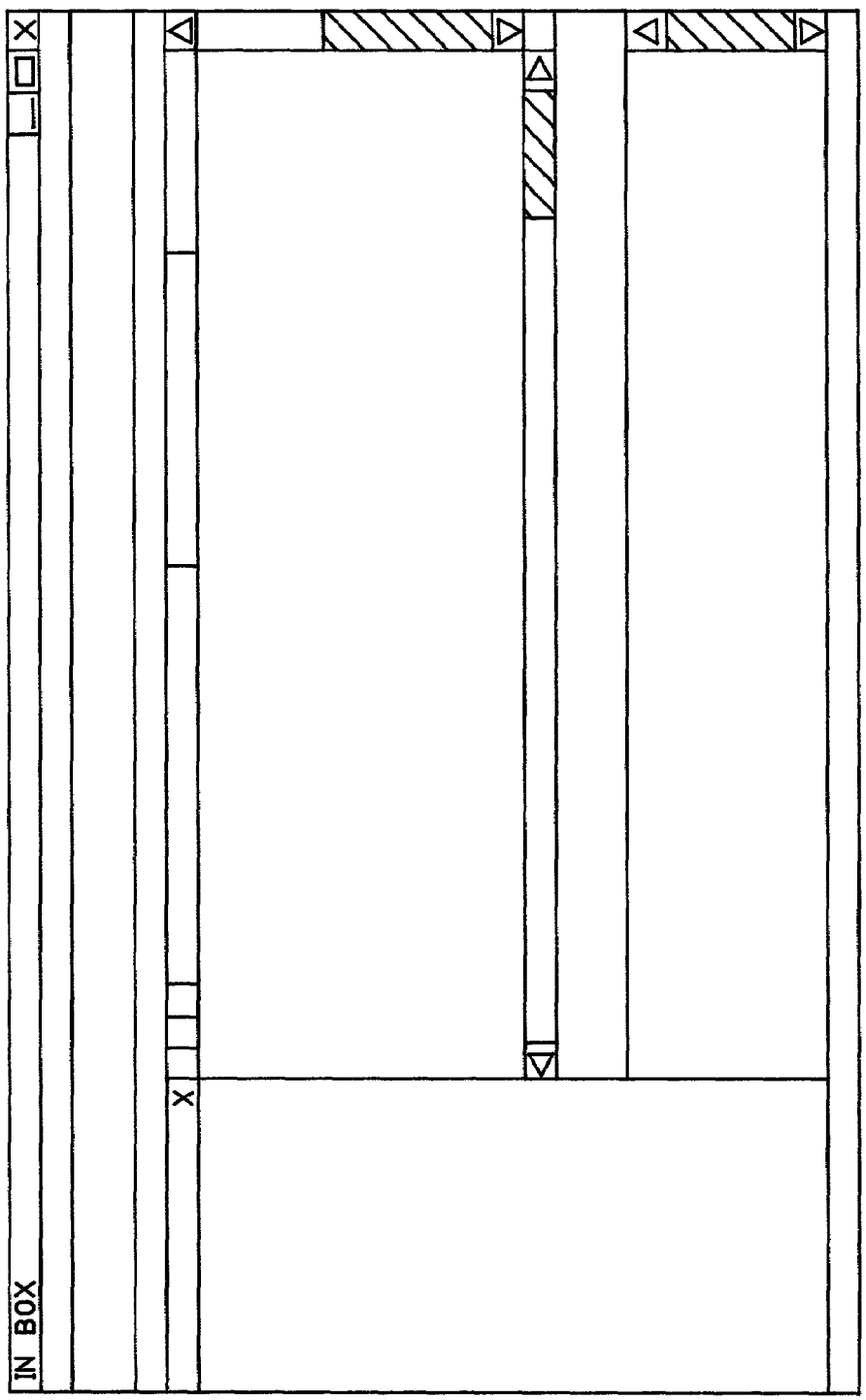
FIG. 6 is an illustration of an incomplete UI associated with an email application.

As mentioned above, the individual button controls, menu controls, and tree view control also contribute to the overall appearance of UI 300, which is rendered by the respective client device. Of course, depending upon the size and device capabilities of the client device, the particular UI may be simpler and easier to render on small displays. Briefly, the first time a connection is made from a given client device to the UI server, the display information (which may be only a few bytes) is transmitted to the client device and cached as a form definition. From then on, the UI is generated based upon the form definition. Importantly, although the controls are arranged in the layout, the form definition need not include labels or icons. For example, FIG. 6 is an illustration of an incomplete or "skeletal" UI 600 associated with an email application. Although the user will not experience the skeletal UI 600 during normal operation, the client device preferably distinguishes different UI components by keeping them in separate memory locations. This allows individual elements to be updated separately, minimizing data transfer in the event of changes at the server side. Once the various controls have been positioned to form the UI 600, the icons, labels, and menu items can be integrated from a separate cache, resulting in an intermediate UI that only lacks the actual source data items (e.g., the message list contents and the text edit fields).

As described above, an email UI generated by a client device can be considered to be an application facade, and although the controls can be used for simple data manipulation, the UI is not actually an email client. The actual email application is server-based and is executed by the UI server, and preferably only the source data items are transmitted to the UI form (and in most cases only enough to fill the current view supported by the client UI). This allows the distributed UI system to offer a fully interactive, constant state experience, yet provide rich functionality such as direct connectivity to a data server using MAPI over a virtual private network such as PPTP or IPsec.

Furthermore, opening large messages or attachments is much simpler because the attachment is actually being opened on the UI server, and only a single page view (and possibly some additional cached data) need be transmitted to the client at any one time. In contrast, conventional wireless PDAs (e.g., PALM™ devices or BLACKBERRY™ devices) cannot open attachments, and a wireless WINDOWS CE™ device must download the entire attachment before opening (and the user runs the risk of format loss due to document conversion, assuming the document type is supported at all). The view presented by the client device may be editable or read-only, depending upon the attachment type and/or the device capabilities.

In the preferred embodiment, the client device utilizes event scripts corresponding to different controls. For example, if the user chooses the "Compose New Message" from an Inbox view, the event script associated with that button will be executed by the client device and a "New Message" form may be displayed. Likewise, when the user manipulates the "Send" button, the application may automatically return to the Inbox view and send the composed data to the UI server for parsing and processing. The primary benefit of event scripts is that they allow some operations to be performed quickly without client/server communication delay, which can be pronounced if, for example, the client device is out of wireless range. Thus, the event scripts can expedite online operation while enabling some off-line functionality.

The above example illustrates some of the advantages of the distributed UI system, particularly in comparison to conventional terminal server architectures. Notably, the data can be reduced to its purest component, only the essential parts of the data need to be sent, the UI is appropriate for the client device platform, and clients need not be specially configured to support each application. For example, in a typical fat client environment, opening an email with an attached word processor document requires a client side email application that communicates with an email server, along with a client side application that can open and display the word processor document. However, by using the distributed UI system, data is converted on the UI server for rendering by the client device in its native UI (unlike a terminal server, which uses the server's UI). The client device will then merge the data with the UI components to provide an interactive interface with a persistent state. Consequently, additional functionality can be added to the UI server (e.g., the ability to open a different file type) without having to install additional software on the client device.

Furthermore, in the initial scenario, the entire word processor document file would have to be downloaded and converted on the client device. Over an often inconsistent and/or low-bandwidth wireless connection, downloading a long file will likely result in failure. As mentioned above, even after the document is downloaded, client device conversions often lead to formatting errors. With the distributed UI system, the client device only displays and stores a relatively small amount of data, and more data is downloaded from the UI server as the user scrolls down to view it. The result is that the same attachment can be opened quickly, without the initial failure-prone download, without huge local storage requirements, and without conversion losses.

In accordance with one aspect of the present invention, the client device can be suitably configured to edit data in "chunks" or small quantities without having an entire file. Thus, a portion of a document can be downloaded to a client device for editing while the remainder of the document is kept at the UI server and/or while other portions of the document are being downloaded. From the end user's perspective, it will appear as though the entire document or data item resides at the client device. This feature may also allow an edited portion or chunk of data to be sent back to the UI server for updating in conjunction with the appropriate server-based application.

Ultimately, the distributed UI system offers the flexibility of a fat client experience without the resource demands of such a system. Client devices can be smaller, have less processing power, less memory, and longer battery life while having more functionality than current fat client devices.

General System Architecture

Figure 7:
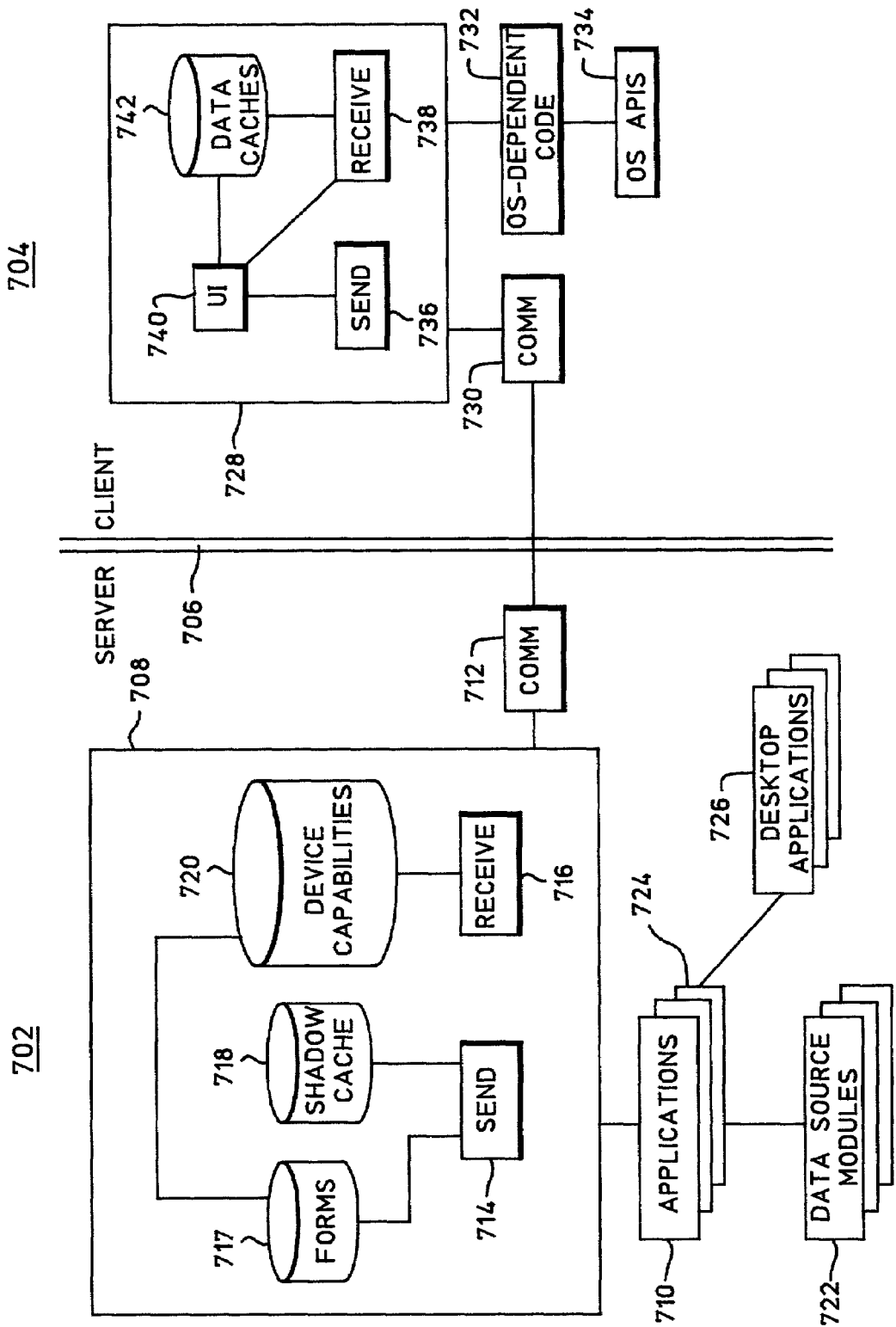
FIG. 7 is a schematic representation of the server and client components of a distributed UI system.
Figure 24:
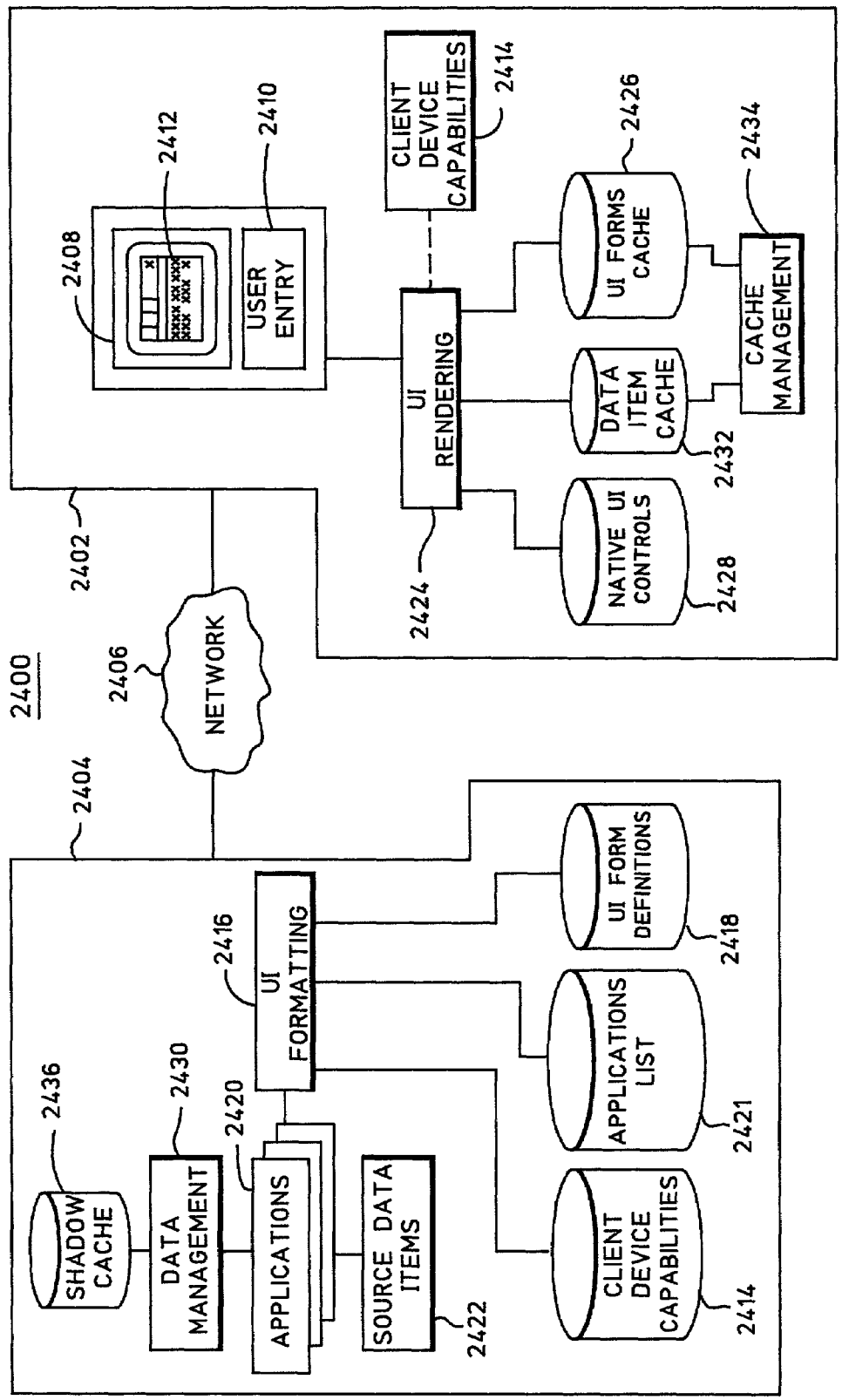
FIG. 24 is a schematic representation of a distributed UI system.

FIG. 7 is a schematic representation of the server and client components of an example distributed UI system. As described above, the elements shown in FIG. 7 may represent software programs, software program modules, functional components, processing tasks or threads, memory elements, application program code segments, or the like. In a practical system, the server-side elements shown in FIG. 7 are included in a UI server processing architecture 702 resident at the UI server, while the client-side elements shown in FIG. 7 are included in a client processing architecture 704 resident at the respective client device. Each of these processing architectures may be realized with one or more processor devices and any number of memory devices (not shown in FIG. 7). FIG. 24 is an alternate schematic view of a distributed UI system; FIGS. 7 and 24 may apply to the same practical system.

Briefly, the UI server processing architecture 702 includes a UI server application 708 that communicates with a number of server-based applications 710 and with a first communication interface element 712. The UI server application 708 includes or is otherwise associated with a server send element 714, a server receive element 716, a UI forms database element 717, a shadow cache element 718, and a device capabilities storage element 720. The server-based applications 710 may communicate with one or more data source modules 722 (which in turn communicate with any number of data servers). The UI server processing architecture 702 may also support a desktop application launcher (which can be realized as another instance of applications 710), which communicates with one or more desktop applications 726 available to the end user.

The client processing architecture 704 includes a client application 728 that communicates with a second communication interface element 730. The first and second communication interface elements 712, 730 are suitably configured to communicate with each other and to facilitate the transmission and reception of source data items, control commands, action requests, and other commands that may be sent between the client device and the UI server (it should be appreciated that the UI server and the client device may utilize any number of known techniques to carry out the actual transmission, reception, and exchanging of information; the communication interface elements 712, 730 are used in the practical embodiment shown in FIG. 7). The client application 728 includes or is otherwise associated with a client send element 736, a client receive element 738, a client UI module 740, and one or more client data caches 742. Client application 728 also functions in cooperation with OS-dependent code 732 and a number of OS application program interfaces (APIs) 734. These OS-related elements may represent memory allocation APIs, thread creation APIs, interprocess communication APIs, mechanisms to retrieve messages from UI controls, or the like. By separating the client application modules from the OS-dependent code 732 and the OS APIs 734, the client architecture can be ported easily to different existing client device platforms.

FIG. 7 depicts the UI server and the client device in a connected mode that supports two-way communication over a network. Although such a connected mode is utilized during each communication session, the UI server and the client device can operate independently and individually in an offline manner. In other words, a permanent or continuous session need not be maintained between the UI server and the client device. For purposes of this example, the UI server and client device are suitably connected in a manner that avoids a firewall 706. For example, in the preferred embodiment, the UI server communicates with the client device via Port 80 (the web browser port). In a preferred wireless embodiment, the two communication interface elements utilize a suitable protocol other than HTTP, which can be cumbersome and not particularly efficient for purposes of the distributed UI system. For example, the communication interface elements may employ a private protocol having the following characteristics: less descriptive overhead than HTML; ability to transmit only the requested source data items rather than all of the data associated with a web page; and ability to support an extensive list of commands that facilitate additional interactivity. Of course, certain deployments, e.g., a desktop network arrangement, may utilize HTTP.

In practice, the communication interfaces 712, 730 will be provided by suitable executable program modules (such as Dynamic Link Libraries (DLLs)) resident at the client device and the UI server. The communication DLLs include, but are not limited to, various functions that manage communications between the client device and the UI server. For example, the communication DLLs may carry out data compression, encryption, port selection, making any pointers self-relative, word size and byte order management (the UI server may take care of these for the client), and socket management. The server-side communication DLL selects a port, for example standard HTTP Port 80, to establish the communication session, and determines how to contact (or listen for) the client. The server-side communication DLL reports dropped connections to the respective server-based applications 710, but the DLL remains responsible for reconnecting to the client device. In other configurations, the client device can connect to the UI server.

UI Server Architecture

As mentioned briefly above, the UI server employs a UI server processing architecture 702. Processing architecture 702 may include any number of server-based applications 710, which are preferably driven by UI server application 708 (in a practical implementation, UI server application 708 is realized as a single executable, i.e., a single ".exe" that serves as a driver application). The UI server application 708 can function as a "caller" that communicates information to and from the communication interface element 712. Briefly, the UI server application 708 performs those server-side tasks and processes that are not otherwise handled by the server communication interface element 712 or the server-based applications 710. For example, the UI server application 708 can perform any of the following tasks: call the communication interface element 712 to establish a connection; manage connects, reconnects, and multiple clients; monitor which server-based applications are installed and available; switch between the server-based applications; load the server-based applications and dispatch messages to them; and provide a number of common functional features, e.g., creating form definitions, calculating font widths, and the like. Notably, the UI server application 708 may also include other functions that are common to more than one application. For example, it may include device capability information and application registration features.

The main loop of the UI server application 708 obtains input from the client device via the server receive element 716, and dispatches commands to the appropriate handling routine associated with the current server-based application (in a practical embodiment, the server-based applications 710 will register a DLL with some standard dispatch entry points). The current application 710 can then call an API associated with the communication interface element 712 to send data to the device. The sending of data is performed by the server send element 714 (thus, UI server application 708 on threaded systems preferably has global data for a "send" queue, a way to wake up the server send element 714, and a flag to interrupt the server send element 714). During operation, UI server application 708 maintains a "send" queue that contains a list of data items, commands, and other information to be sent to the client device.

Although not a requirement for the system to function, the preferred practical embodiment utilizes at least two threads in the UI server application 708, e.g., a server send thread and a server receive thread. Separating the sending and receiving threads is desirable to ensure that individual operations can be easily canceled, particularly in view of the manner in which the UI server processes and sends information in "chunks" to the client device. Thus, the server send thread can handle cancellations and state changes obtained from the server receive thread, which collects commands, input, and information from the client in an independent manner. It is possible, however, to implement this code in non-threaded modules; such an implementation may be preferable in a scalable server environment.

The server-based applications 710 can represent any number of different applications, features, or functions, e.g., an email application, a calendar application, an address book or contact list, a chat application, a task reminder list, an alarm feature, a messaging service, or any other application that could run on a desktop (or other) computer. These applications reside primarily at the UI server, which handles most, if not all, of the application processing on behalf of the client devices. Other than telling the client device what UI changes to make based on the current UI state and actions selected by the user, the job of the UI server is basically to be a remote data source. The primary difference between this type of data source and typical ones is simply that the client need not know the names, types, or source of the data; the UI server is responsible for obtaining and formatting the data for the client based on a data ID that the UI server associates with the control descriptions in the form definition. Notably, the UI server can be configured to communicate with and support multiple data sources for any given server-based application 710. For example, PIM applications may utilize a number of different data sources, e.g., MICROSOFT EXCHANGE™, STARFISH ORGANIZER™, NOVELL COMMUNICATOR™, and the like. Accordingly, each of the server-based applications 710 preferably contains an interface to a per-application data source module 722, which can be replaced depending on which data source is being used.

In accordance with one possible example implementation, the UI server application 708 may be implemented as a state machine having a number of application-sized DLLs. Thus, although actually realized as a combination of application modules, each of the server-based applications 710 will appear as separate applications to the user of the client device. Each of these DLLs can have separate routines to handle the state of a given form. The UI server preferably maintains the current state of each server-based application 710 even when communication problems are reported by the server communication interface element 712. This feature allows the distributed UI system to maintain the various applications persistently regardless of the connection status of the client device. In addition, the UI server application 708 preferably includes an API configured to register the server-based applications 710, and each individual application 710 can call another API to obtain a list of the server-based applications 710. In this manner, a listing of all available or supported applications 710 can be placed in a menu or control element (e.g., a "GO" menu) generated by each individual application 710.

In another possible implementation, the UI server application 708 need not be realized as a state machine. In addition, although not a requirement of the present invention, any of the server-based applications 710 can be realized individually as a state machine. In this implementation, the individual applications 710 are not provided with the application list. Rather, UI server application 708 can send the application list to the client device, which in turn makes it accessible from within any of the server-based applications 710. Alternatively, the client device may include a separate application that is devoted to the display of the application list.

The server-based applications 710 may communicate with any number of data source modules 722, which in turn obtain source data items from one or more data servers (see FIG. 1). The data source modules 722 may utilize any suitable communication protocol or model, e.g., the MICROSOFT™ OUTLOOK OBJECT MODEL (OOM), to communicate with the data servers. For example, multiple data source modules 722 may be suitably configured (in accordance with known techniques) to each communicate with one of the following server types: MICROSOFT EXCHANGE™, LOTUS NOTES™, POP3, and SMTP. Alternatively, a single data source module 722 could use a multi-source API, such as OOM, to communicate with any one of those data sources. Once obtaining the source data items, the data source modules 722 can function as an interface or an intermediary for the server-based applications 710 that process the source data items. In this respect, the server-based applications are configured to manipulate source data items for presentment and/or editing at the client device.

As mentioned briefly above, the UI server processing architecture 702 preferably includes or communicates with the UI forms database element 717. UI forms database element 717 preferably stores information related to the forms, controls, layouts, parameters, and/or characteristics associated with the application UIs. In a practical embodiment, the UI forms database element 717 stores form definitions that are utilized by the client devices during UI processing and rendering. In the preferred embodiment, the UI controls, UI forms, and UI definitions are based (at least in part) upon a number of device capabilities for the respective client device. This functional relationship is depicted in FIG. 7, which shows the UI forms database element 717 operatively coupled to the device capabilities storage element 720.

Any given control on a UI form can have a list of commands (or a script) to execute when the control is activated, manipulated, or selected by the end user (via, e.g., a button press, double-clicking on a listview item, making a listbox selection, or the like). These "scripting" commands may be a simple subset of the commands that the UI server can send to the client device. These commands allow the client device to perform common actions locally without relying on the UI server. Notably, the command scripts can be specified by the UI server and communicated to the client device at an appropriate time (e.g., during an initialization session), or the command scripts can be pre-loaded into a suitable client device software application that is compatible with the corresponding UI server application. Thus, although the command scripts are executed by the client device, they may originate at the UI server.

The UI forms can be dynamically or statically defined as text files or in accordance with any suitable file format. The server-based applications 710 may also include a default dynamic layout generator to support new client device configurations or platforms. In addition, the UI server application 708 and the applications 710 can be updated as necessary for compatibility with new client platforms. As noted previously, the UI server architecture 702 is preferably in charge of most, if not all, of the UI details, which simplifies the client device processing and makes system updating easier.

Shadow cache 718, which is maintained by the UI server, may include a list of source data items, UI form information, and other client-related data that has been transmitted from the UI server to the client device. The shadow cache 718 may also include a list of new or modified data items, UI form information, and other client-related data received from the client device. Thus, the shadow cache 718 may contain data representing items transmitted from the UI server to the client device and/or items that have been saved in the client cache. The UI server can interrogate the shadow cache 718 to determine the data cached at the client device, and update the shadow cache 718 in response to modifications to cached data entered by the client device. Shadow cache 718 allows the UI server to monitor the status of the client cache, maintain synchronization with the client device, recognize when it is appropriate to "push" certain data types to the client device, support the persistent application states, and allows the UI server application 708 to manage the downloading of new or modified information to the client device without repeatedly invoking applications 710.

The device capabilities storage element 720 is preferably accessible by each of the server-based applications 710. This storage element 720 stores the device capabilities of the respective client device. In the preferred embodiment, the UI server obtains the device capabilities for each client device during the initial session. As used herein, "device capabilities" means any parameter, specification, requirement, limitation, physical or functional characteristic, identifying information, or status information for the client device. The UI server utilizes one or more device capabilities to define the UI forms for the client device. A practical UI server may obtain, process, and store one or more of the following device capabilities (the following list of examples is not intended to limit or otherwise restrict the scope of the present invention):

ability to process documents in rich text, bitmap, HTML, WAP, and/or text format;
device manufacturer;
a version or release identifier;
device OS;
display screen dimensions (e.g., width and height);
screen type (e.g., pixel or block) and resolution;
form area dimensions (e.g., width and height) and location;
taskbar dimensions (e.g., width and height) and location;
scrollbar dimensions (e.g., width and height) and location;
maximum receivable packet size;
desired or default font;
list of available native controls;
list of available native icons;
specifications or formatting for any custom icons; and
client cache size.

Desktop Application Launcher

The UI server processing architecture may also include desktop application launcher 724, which is suitably configured to allow the user to launch applications or programs that are normally accessible via the desktop. In a practical implementation, the application launcher 724 is realized as one of the server-based applications 710. Application launcher 724 preferably communicates with the various desktop applications 726, which may be maintained by (or accessible to) the UI server. The application launcher 724 will try to shrink the desktop application down to a small window and monitor the output of the desktop application. The application launcher 724 converts display data from the desktop application into a format compatible with the distributed UI system. Thus, the UI server can dynamically transmit the converted data to the client device for rendering. The application launcher 724 will tell the client device what UI elements to draw, and will send textual or graphical output to the appropriate controls on the client device. Buttons (and other user entries) pressed on the device will be converted into the same or equivalent entries in the desktop application 726.

Effectively, the application launcher 724 functions as an intermediary that sends output from the given desktop application to the client device, and input from the client device to the desktop application. In practice, the application launcher 724 can use a suitable messaging format compatible with the server OS, e.g., Windows messages. In this respect, the distributed UI system can also function like a terminal server, but with greatly reduced bandwidth requirements.

The UI server processing architecture 702 may also include a software developer kit (SDK) that allows third party developers to write more server-based applications 710. The SDK also makes it easier to port an existing desktop application for use with the UI server.

Client Device Architecture

In the preferred embodiment, the client application 728 (along with the communication interface element 730 and the OS-dependent code 732) is embedded in read-only memory in the client device. In a practical deployment, a given client device need not be upgradeable. Thus, the client application 728 is preferably designed to be compatible with any number of UI server versions. Although the client application 728 may reside on a client device that is specifically designed for compatibility with the UI server, the client application 728 will likely be ported to many device platforms (possibly released by many different manufacturers). Accordingly, client application 728 is preferably configured in a manner that isolates the platform-specific and/or OS-dependent code 732 (e.g., code associated with creating windows, allocating cache memory, displaying bitmaps, and the like).

Although multiple threads are not required, in the example embodiment, the client application 728 includes three separate processing threads or modules: the client send (or response) thread 736, the client receive (or command) thread 738, and the client UI thread 740. The client receive thread 738 is dedicated to processing commands, source data items, and other information that come from the UI server. The client receive thread 738 may communicate with the UI thread 740 and the client data caches 742. The receive thread 738 will basically sit in a loop while receiving commands from the UI server. In response to the commands, the receive thread 738 may place data into data caches 742 or notify the UI thread 740 when it has work to do. Client receive thread 738 is capable of interrupting the other client elements if the command so requires (for example, if the command instructs the client device to switch to a new UI form).

To receive and process a command from the UI server, the client receive element 738 calls a routine that waits for a full command to arrive at the socket (in a practical implementation, each command is preceded by a simple 16-bit length). If part of a command arrives and the rest does not arrive in a timely fashion, then the client receive element 738 may initiate a resend request. The client receive element 738 may also be responsible for decrypting and decompressing the received data, adjusting self-relative pointers, and placing the data into a suitable structure. Thereafter, the receive element 738 enters a switch statement based on the command type. For example, most commands will be to either set or modify data in the cache (and let the UI module 740 know of the change), or to tell the UI module 740 to make a change (e.g., move a control, load a new form, or the like). Consequently, the receive element preferably understands the format of all commands used by the UI server and understands the details of the client caches 742.

The separate UI module 740 is preferably dedicated to UI tasks, such as drawing UI forms, displaying the data that arrived in the client receive element 738, and acting on commands given by the user. The UI module 740 waits for commands from the client receive element 738 and commands generated by end user manipulation of the client device. The UI module 740 also understands the client data caches 742, so that it can update the UI display when ordered to do so by the receive element 738. For example, if the UI module 740 needs some data items that are not in the data caches 742, it will request such data via the client send element 736 (but not display it until told to do so by the receive element 738). In response to a user action, the UI module 740 may poll a cached table of "script" commands to determine what action the client device should take. The data may include a token or other suitable identifier to specify which form was active when the client device requested more information (the user could have switched to a different form while waiting for additional data). These tokens can be provided by the UI server along with the data; the client device may handle the tokens like opaque identifiers.

The client send element 736 is dedicated to sending data to the UI server. In the preferred embodiment, the client send element 736 is separate from the UI module 740 so that the client device can easily resend lost data packets. The send element 736 will largely send information to the UI server as requested by the UI module 740. The send element 736 may also collude with the receive element 738 to ensure that transmitted requests are acknowledged in a reasonable amount of time; if not, the request can be resent. In the preferred embodiment, a server acknowledgement is monitored for all information sent to the UI server. This allows the client device to keep track of data the server hasn't received. Similarly, when the UI server sends multi-part replies in response to a client request, the UI server preferably sends the response acknowledgement with the last part.

The send element 736 may also be configured to obtain data from the UI module 740 and call a routine to turn it into socket data (or into any suitable data format compatible with the current data communication scheme). The send element 736 can also prepend command length and command identification (which gets acknowledged by the UI server, so that the client device can tell that the communication was successful), make pointers self-relative, compress the data, encrypt it, and send it to the UI server.

Client Caches

The client device maintains a number of caches for various types of data. For example, the client device preferably stores a list of UI forms or UI form definitions, which can be named so that the various server-based applications can share them. Each UI form may have cached controls, and each control may include cached data. The data specifies which form, which instance of the form (for example a "Read Message" form can be used to view many messages), and which control. In addition, some controls, e.g., list-views, may include an array of data. Although the present invention is not limited to the processing of any particular data types, typical data items will represent text, icons, or bitmaps. Due to practical storage space limitations, the client device may run out of cache memory after a period of use. As a result, the client device is preferably configured to clear items from the data caches 742 to accommodate incoming data as it arrives from the UI server.

Figure 8:
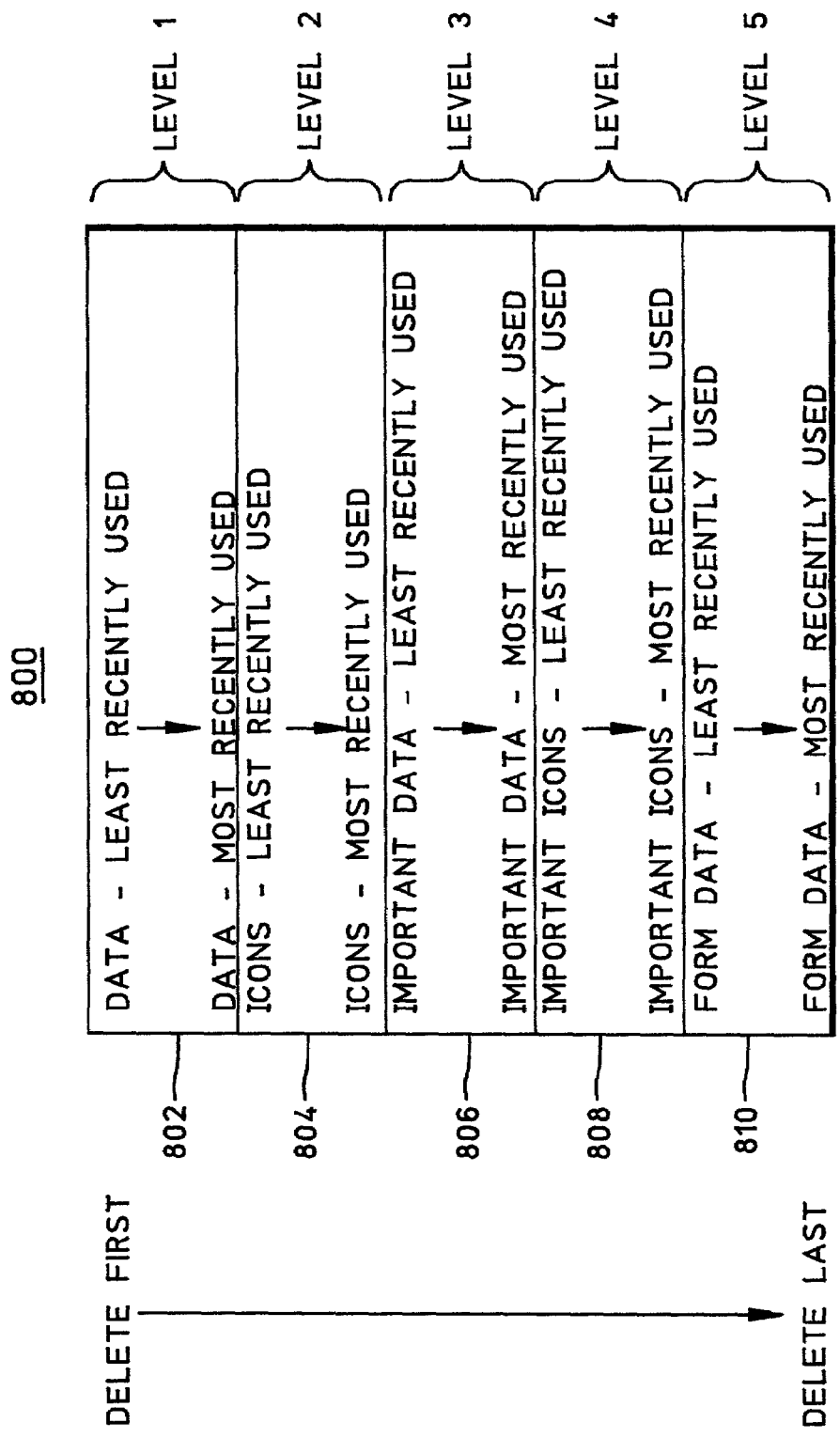
FIG. 8 is a schematic representation of a client cache structure.

FIG. 8 is a schematic representation of a client icon and control data cache structure 800 that may be used by the distributed UI system. In addition to the UI controls being separated from the application, the icons, menu items, and labels that map to the controls in a form definition are also kept in another cache structure. This is done for two reasons. First, the application service provider (ASP) or wireless carrier may choose to change the look and feel of an application, or change a single item without changing the UI layout of the application. Separating the individual characteristics of a UI gives the ASP more flexibility. The second reason is that certain icons (e.g., formatting icons or menu items) are repeated across various applications. Referencing them from a separate cache reduces the need for redundancy and maintains lower resource requirement.

Due to practical memory storage limitations, the size of a client cache may vary from platform to platform. Accordingly, the client device application is preferably configured to maintain the client cache in a hierarchical manner such that some information types are protected while less preferred information types are more readily deleted to accommodate newly downloaded data. For example, cache structure 800 may include any number of logical levels or divisions. In practice, each stored data item may include an identifier that represents such a level. In the illustrated example, the first level 802 is associated with ordinary source data items that have the lowest preference, i.e., these items are discarded before other items contained in the lower levels. The fifth level 810 is associated with form data or form definitions. The fifth level 810 contains information types having the highest relative preference, i.e., these items are the last to be discarded when the client device needs additional cache space.

In the example embodiment, the first time the UI server connects to the client device, the details of how the controls are to be arranged are cached and an application identification is associated with them. From that point on, unless otherwise stipulated by the server, that application facade will be built from the cached UI form data. The UI server need not be consulted with regard to the stored UI layouts. In addition, individual UI elements need not be actually downloaded. Instead, the UI server can simply send directions to the client device, instructing the client device to use native OS GUI elements, which are already on the client as part of the client platform OS. Leveraging native controls improves performance and provides a more interactive, fat client feel to the remote application. In addition, such leveraging lowers the overall network bandwidth requirements.

The remaining levels correspond to increasing importance or higher preference: the second level 804 is associated with UI icons; the third level 806 is associated with important data; and the fourth level 808 is associated with important UI icons. The "importance" of the items may be dictated by the UI server; important data or icons are those that the user is likely to use soon or those that the client device may utilize more often than others. For example, the text of an email message need not be labeled as important because once opened, the user is less likely to open it again in the near future. On the other hand, a list of messages is important because the user is likely to switch often between the list and specific messages in the list.

Within any given cache level, data is removed according to when it was last used by the client device. Thus, the least recently used (the "older" data) is discarded first, while the most recently used (the "newer" data) is preserved as long as possible. Accordingly, assuming that all of the existing items in the client cache structure 800 will be replaced, the least recently used data of an ordinary nature will be deleted first, while the most recently used form data will be deleted last. The arrow in FIG. 8 represents the order in which the cache items will be discarded.

In addition to cache structure 800, the client device may maintain a control object mapping cache, an event cache, and/or other logically separated cache structures. The control object mapping cache facilitates the client platform independence of the distributed UI system. The first time an application is launched (or any time the UI server informs the client that there has been a change) the UI server sends the client device a number of form definitions, which serve to describe the application facade. However, because every platform can have different controls, the control object mapping cache servers as a "virtual machine" to determine which controls map to each UI server command. Understanding that each platform has different limitations, the UI server can vary the UI description based on the client device, however, the basic controls can still be assumed. This information is preferably stored in a separate cache so that controls can be added at a later date to expand the platform functionality, and to thereby change the mapping. By simply updating the control object mapping cache, the new controls can easily be added to the platform.

The event cache (which may be considered to be a part of the UI form data cache) is used to map specific UI elements to an event or an action. For example, in an email application, the "Compose New Mail" button can be mapped to the matching form definition such that the UI is immediately displayed when the user chooses the option, without ever referencing the server. Again, this allows multiple applications to share common events, thereby lowering redundancy and allowing events to be updated or added, on an as-needed basis, by the UI server.

Virtual Controls

As described above, the client device may include any number of "virtual" controls. For example, any item that contains a large amount of data, e.g., a dropdown list, a listview, a multi-line edit control, a picture, or the like, can be sent from the UI server in small chunks or increments. The client will cache each segment and request additional segments as necessary when the user navigates the data. In practice, the UI server can initially transmit a complete length identifier or a number of listview items. Then, the client device can assume data management responsibilities and request items when necessary to fill the client cache. The client cache preferably contains enough data to allow the user to navigate the UI display without waiting for an unreasonable period of time.

In one practical embodiment, the client device can maintain a virtual scrollbar (or some such control) to allow the user to navigate the data while it appears as if all of the data is present on the client device. Thus, although the scrollbar can be rendered in conjunction with another control element (e.g., a listview), it can be realized as a distinct control that is configured to modify the contents, characteristics, or representation of the "linked" control element. In this respect, a virtual UI control rendered by the client device can be suitably configured to impact a remote data source. The client UI module 740 need not wait for requested data; the user may scroll down a bitmap for a while, then switch to another form while lookahead data is being sent by the UI server. The data items can be modified by the UI server; for example, listview items may be inserted and deleted when new email comes in or when the user deletes a message.

Send/Receive/Reconnect Processing

In accordance with one example implementation, the procedure for sending and receiving data and commands is essentially the same for the UI server and the client device. Each side maintains two queues of data packets: one is a list of unsent packets and the other is a list of packets that were sent but have not been acknowledged by the other side. Once a connection is established, the send element looks at any data in the "send" queue and proceeds to send the any packets (in order) across the connection. After a successful send operation, the packet gets moved to the back of the "sent" queue (assuming that no exceptions exist).

Meanwhile, the receive element sits and waits for data to arrive from the other side. When a complete packet or command arrives, the receive element analyzes the packet header to determine whether the current packet is an unsolicited packet or a packet meant as a receipt acknowledgement. For instance, the client device can make this determination by checking whether the current command is in the range of client commands or in the range of server commands. A client command implies that the current packet is simply an acknowledgement from the server and that the associated packet sent earlier by the client has been received. If the current packet is indeed an acknowledgement packet, then the receive element looks at the front of the "sent" queue and removes the corresponding packet. That packet has now been successfully received and need not be monitored any longer.

If the received packet is an unsolicited command, then the recipient should immediately acknowledge the packet. An acknowledgment packet is created and placed into the "send" queue. The send element will see this packet as it processes the "send" queue and send it to the other side. However, it will not move the acknowledgement packet into the "sent" queue after sending.

For recovery after a session has been interrupted and is reconnected, each side is responsible for ensuring that possibly lost data is resent in the correct order. To this end, each side places its entire "sent" queue to the front of the "send" queue or into a "resend" queue. This reprioritization ensures that any data that has not been verifiably received by the other side will be sent in the proper order. This scheme creates a problem in that it is possible for a packet that was indeed received by the other side to be resent if an acknowledgement has not yet been sent or received. This problem can be addressed by handling acknowledgements for unsolicited commands in a slightly different manner. For example, each side can remember a place-holder for the last acknowledge packet it sends. When it receives a new unsolicited packet with a placeholder less than the last acknowledged placeholder, it recognizes the new unsolicited packet as a resend of something that it has already processed. Thus, it can send another acknowledge and discard the new packet.

Process Flow Examples

The UI server and the client device are each configured to perform a number of procedures, processes, and tasks to support the operation of the distributed UI system. A number of example process flow situations are described in detail below. For the sake of consistency, these process flow situations may refer to the distributed UI system elements and features described above. Notably, a practical implementation of the distributed UI system can implement the following procedures in a number of equivalent ways and the specific process tasks described herein (and order of execution of such tasks) may be varied, eliminated, or supplemented to suit the needs of the particular deployment.

General Client-Server Operation

Figure 9:
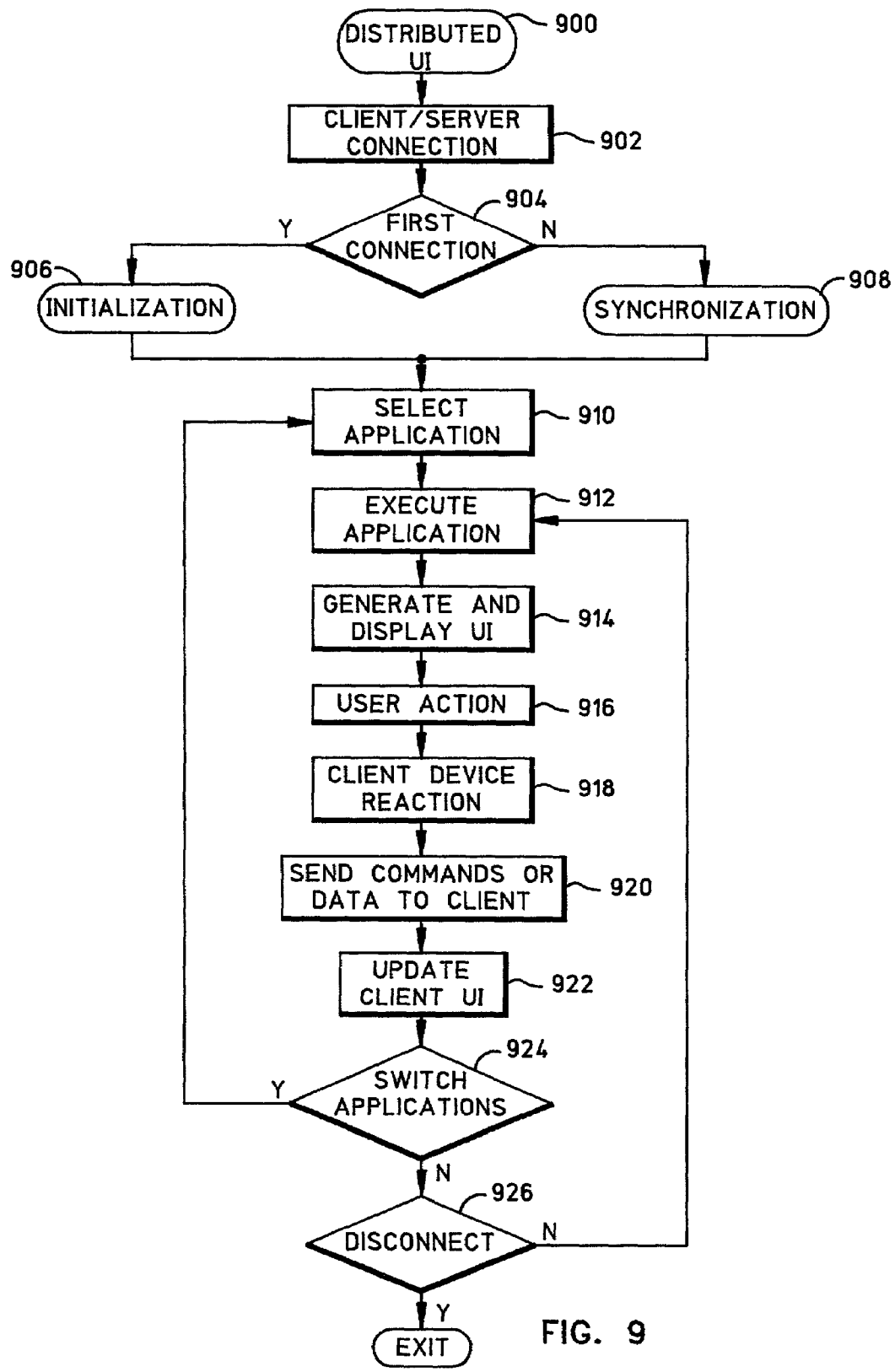
FIG. 9 is a flow chart of a distributed UI process.

FIG. 9 is a flow chart of a distributed UI process 900 that may be performed by a distributed UI system as described herein. Process 900 begins when a client device establishes a connection with a UI server (task 902). The respective client and server communication interface elements may function to establish this connection (in the preferred embodiment, the connection is established over a network such as the Internet). Once the connection is made, process 900 determines whether the session corresponds to the first connection between the particular client device and the UI server (query task 904). The UI server may make this determination by, e.g., comparing a received client device identifier to a table of known or previously-connected client devices. If the current session represents the initial connection between the client device and the UI server, then an initialization process 906 (described in more detail below) is prompted. On the other hand, if the current session is a reconnection following an offline period, then a synchronization process 908 (described in more detail below) is prompted.

After the client device and the UI server are initialized or synchronized, the user can select a server-based application from a list of available applications maintained by the UI server (task 910). In response to the user selection, the UI server executes the selected application (task 912), which may be configured to manipulate source data items for presentment at the client device. Meanwhile, the client device generates and displays a UI form (which may include any number of UI controls) suitable for use with the selected application (task 914). In this respect, the UI presents the received source data items to the end user in a manner consistent with the operation of the selected application.

While traversing the displayed UI, the user may manipulate the UI form or a UI control, or otherwise perform an action at the client device (task 916). For example, in connection with an email application, the user may initiate a "Compose New Message" request, double-click on a listview entry to read a message, manipulate a scrollbar to view additional entries or additional text, delete a message or an entry, switch to another application, or reply to a message. In response to the user action, the client device may react in an appropriate manner (task 918). For example, the client device may execute one or more command scripts associated with the action or generate and transmit a corresponding action request or command. The scripts and action requests may be associated with the sending of information to the UI server and/or the requesting of information or source data items from the UI server.

The UI server can receive and process the client action requests and commands in a suitable manner to determine how best to respond. For example, in response to the client command(s) and/or request(s), or in response to the presence of new data at the UI server, the UI server may send any number of commands and/or source data items back to the client device (task 920). After receiving the new information from the UI server, the client device updates the UI form or a number of UI controls (task 922). The specific updating characteristics will depend upon the information received from the UI server.

The distributed UI process 900 may proceed in a loop until the end user or the UI server decides to switch applications (query task 924) or disconnect from the UI server (query task 926). In response to the switching of applications, task 910 may be re-entered to handle a new selection. In addition, the synchronization procedure 908 (or portions thereof) may be repeated for any newly selected application. In other words (although not apparent from the illustrated ordering of the process flow), the initial synchronization procedure may be configured to synchronize all server-based applications upon connection, only the selected application, or one or more default applications. Thus, while connected, the user can interact with the selected server-based application in an ongoing manner.

Client/Server Initialization

Figures 10, 11:
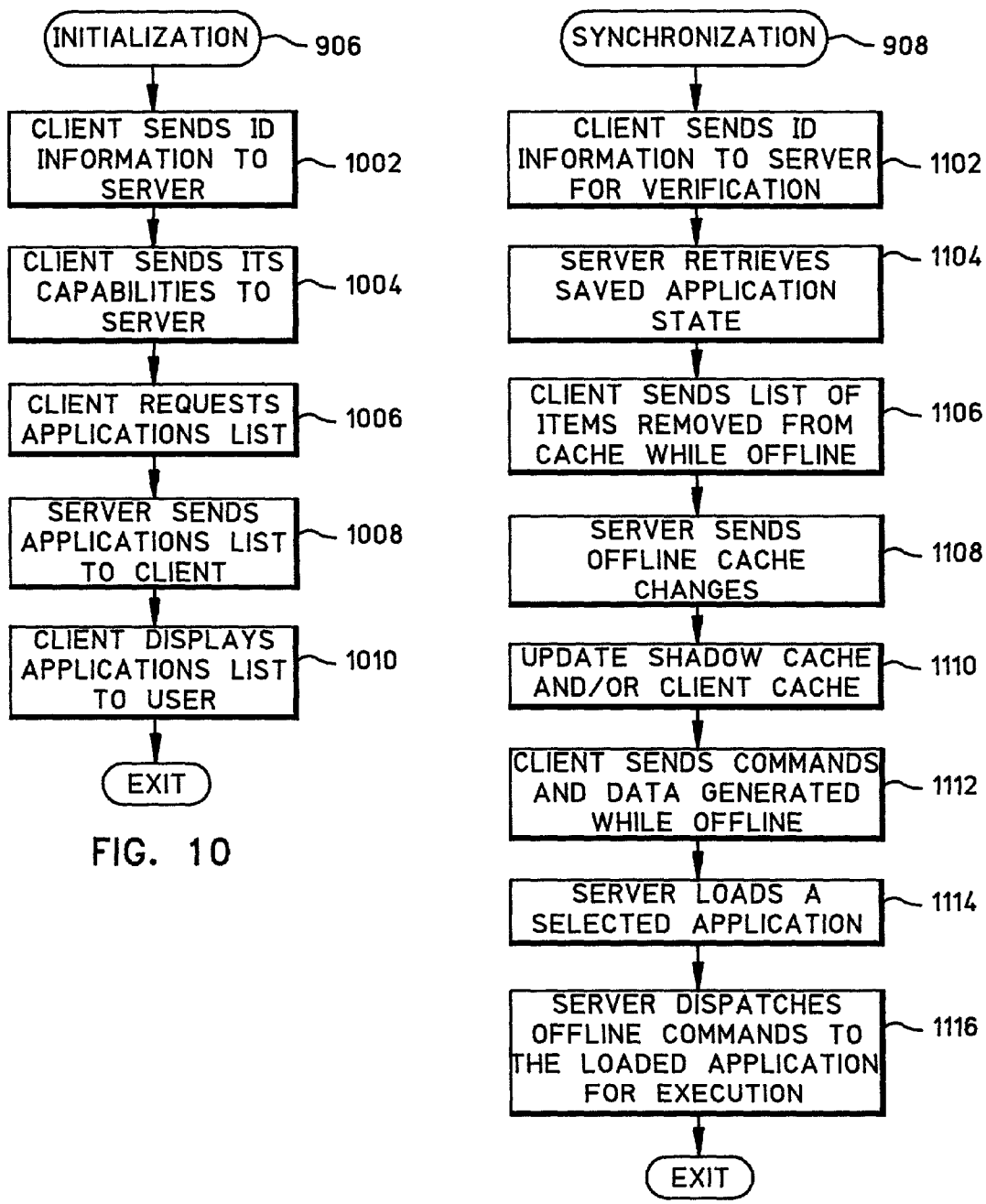
FIG. 10 is a flow chart of an initialization process that may be performed by a distributed UI architecture.
FIG. 11 is a flow chart of a client-server synchronization process that may be performed by a distributed UI architecture.

FIG. 10 is a flow chart of an example initialization process 906 that may be performed in conjunction with distributed UI process 900. In response to the first connection between a particular client device and the UI server, the client may send identifying or registration information to the UI server (task 1002). Such information serves to uniquely identify the client device so that the UI server can maintain its server-based applications in a persistent state for each client device. The identifying information may include, without limitation, any of the following items: user name and password; device ID; device serial number; or device type. In addition, the client device sends its device capabilities to the UI server, using any suitable format (task 1004), and the UI server saves the device capabilities for future reference.

The client device or the end user may eventually request an applications list from the UI server (task 1006). The applications list request may be automatically generated during initialization or it may require end user interaction. The applications list specifies the server-based applications to which the client device has access. In response to the request, the UI server responds by sending a suitable applications list to the client device (task 1008). Of course, the UI server may respond with a "No Applications Available"

message, thus prompting further action by the end user. Assuming that one or more applications are available, the client device can display the applications list to the end user (task 1010). For example, a practical client device implementation may provide a "Start" or a "Go" button on the client UI such that the end user can display the list from any application and launch any of the available applications in a convenient manner.

Client/Server Synchronization

FIG. 11 is a flow chart of an example client/server synchronization process 908 that may be performed in connection with the distributed UI process 900. As described above, client devices can perform actions and operations while offline, i.e., while disconnected from the UI server or during periods of poor connectivity. Such offline actions can modify or delete one or more source data items at the client device. In addition, the UI server can modify, delete, or add to existing source data items while the client device is disconnected. Synchronization process 900, or a suitable equivalent, can be performed to ensure that the client device and the UI server are each updated to reflect any offline changes.

Synchronization process 900 is preferably executed after the client device reestablishes a session with the UI server. Once reconnected with the UI server, the client device sends a suitable identifier for verification with the UI server (task 11 02). If the UI server validates the client device, then it may retrieve the saved application state for the client device (task 1104). In practice, the UI server saves the current state of an application whenever the client device is disconnected. In this respect, the UI server may retrieve the state for any individual server-based application or it may retrieve a global state representing all of the applications for the client device.

The client device may send a list of items that were removed from the client cache (to obtain free storage space) while offline (task 1106). The items can be removed from the client cache and a suitable notification may be generated and placed in the client "send" queue. The list of removed items may be a combination of individual notifications or a single notification that identifies all of the removed items. In contrast to this "batch" transmission procedure that follows an offline period, while connected to the UI server data items removed from the client cache are regularly sent to the UI server for reconciliation.

The UI server may then send any offline cache changes to the client device (task 1108). Such offline cache changes may represent incoming data associated with a cached list, e.g., new email arriving where the client device has a cached message list. In the preferred embodiment, the shadow cache maintained by the UI server (see FIG. 7) is updated to remove any data items deleted by the client, to reflect any client modifications of source data items, and/or to reflect any additions, deletions, or modifications made by the UI server in conjunction with the execution of any offline commands (task 1110). In addition, the client caches are updated to the extent necessary to reflect the currently synchronized status.

The client device may also transmit a number of commands indicative of one or more offline actions and/or data generated by the client device while offline (task 1112). For example, while offline the end user may generate action requests that would otherwise be immediately executed by the UI server. Such action requests are placed on "hold" until the client device is reconnected to the UI server. As another example, the end user may create new messages or modify existing data while the client device is in a disconnected mode. The new data items, modified data items, and associated commands are sent during task 1112.

Eventually, the client device will select an available application and the UI server will load the selected application (task 1114). At this time, the UI server may dispatch the appropriate offline commands and requests to the currently loaded application for execution by that application (task 1116). The offline commands are preferably executed in the order in which they were sent from the client device. Upon completion of task 1116, the current state of the client device should be synchronized with the UI server.

Application and Form Selection

Figure 12:
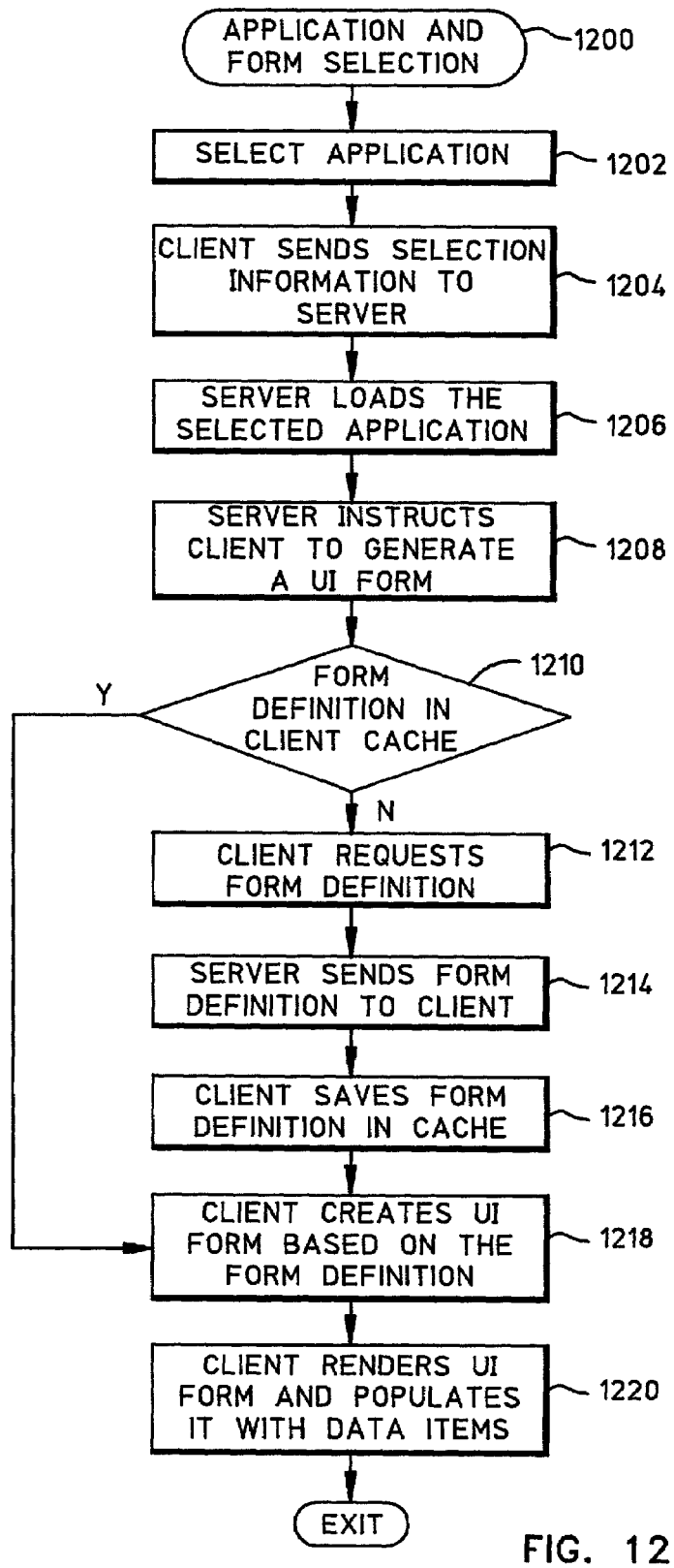
FIG. 12 is a flow chart of an application and form selection process that may be performed by a distributed UI architecture.

FIG. 12 is a flow chart of an application and form selection process 1200 that may be performed by a distributed UI architecture. Process 1200 selects an appropriate UI form for display at the client device in response to the selection of a particular server-based application. Accordingly, process 1200 begins when the client device selects an available server-based application (task 1202). In response to the selection, the client device sends the selection information, which identifies the particular application, to the UI server (task 1204). In response to the selection, the UI server loads and executes the application (task 1206). Thereafter, the application commands the client device to generate a particular UI form (task 1208). In a practical embodiment, the UI server may send a UI form definition or a corresponding identifier to the client device; the UI form definition may be particularly suited to the client device platform and/or to the selected application (as described above, the UI form definition is preferably based upon a number of device capabilities for the client device). In this respect, although the client device actually renders the UI, the UI server dictates which UI forms to display. The specific UI form may be a default view associated with the selected application or it may be based upon an end user action. For example, an email application may automatically request an "Inbox" UI form having a list of email messages.

In response to the UI form command, the client device may interrogate its cache to determine whether the requested UI form definition is available (query task 1210). If not, then the client device requests that UI form definition from the UI server (task 1212). In response to this request, the UI server retrieves (or generates) the UI form definition and sends it back to the client device in a suitable format (task 1214). After receiving the UI form definition, the client device saves the definition in its cache (task 1216). In the preferred embodiment, the client device saves all form definitions in the lowest cache level such that the form definitions are the last data types to be deleted from the client cache (see FIG. 8 and corresponding description of the client cache). Once the UI form is stored locally in the client cache, the client device can retrieve the UI form definition without having to contact the UI server.

Once the given UI form definition is placed in the client cache, the client device may create the corresponding UI form based on that definition (task 1218). In the preferred practical embodiment, the client device generates the UI form using native UI controls that are associated with the client platform OS. Thereafter, the client device can render the UI form and populate the UI with the respective source data items (task 1220).

If a UI form definition is modified by the UI server, then portions of process 1200 may be executed to ensure that the client device always utilizes the most current version of each UI form. In this regard, the form definitions may include date and/or version stamps that enable the UI server to determine whether the client cached versions of the form definitions are the most current.

Client Cache Maintenance

Figure 13:
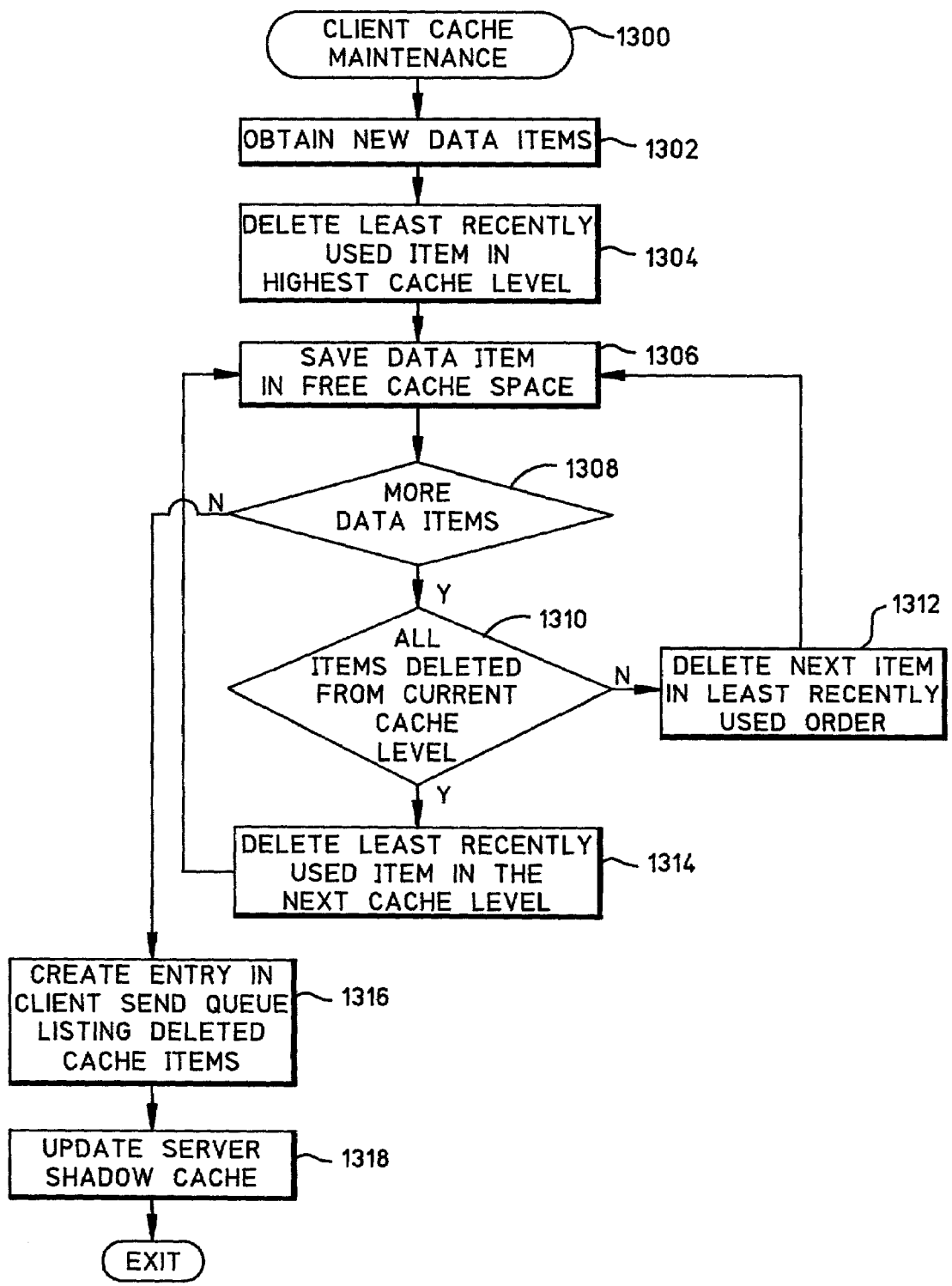
FIG. 13 is a flow chart of a client cache maintenance process.

FIG. 13 is a flow chart of a client cache maintenance process 1300 that may be performed when the client device receives data from the UI server. For purposes of this example, the client cache is assumed to be full such that older data must be deleted or removed before new data can be saved. Otherwise, if the client cache has a sufficient amount of capacity, then the data items will be saved as usual without requiring the deletion of cached items. Process 1300 is set forth herein for consistency with the example client cache structure shown in FIG. 8.

Client cache maintenance process 1300 begins when the client device obtains new or additional data items from the UI server or when the client device itself generates new or additional data items for placement into the client cache (task 1302). The client device may be configured to process the incoming data items in the order in which they were received or in accordance with any prioritization scheme. For purposes of this example, data items are handled one at a time. Of course, process 1300 may save the new data items in chunks after the required amount of storage space is available.

To free up space, process 1300 initially deletes cached data items from the highest cache level, starting with the least recently used data (task 1304) and progressing to the most recently used data associated with that level, as described in connection with FIG. 8. If a cached data item is locked, then the client device will not attempt to remove it from the cache. Data items may be locked by the client device if they are included in a displayed UI form or if they are currently being modified by the client device. Once the requisite amount of space is available, the new data item is saved in the free cache space (task 1306). (If the new data item requires more memory than the last-deleted cache item, then additional cache items may need to be deleted in an iterative manner as described below). Thus, the existing data source items are deleted to accommodate the incoming data items.

If more of the new data items remain (query task 1308), then process 1300 continues. Otherwise, process 1300 may lead to a task 1316 (described below). If the client cache contains more items at the current cache level (query task 1310), then the next item in that level is deleted (task 1312). As mentioned above, the cache items associated with any given level are preferably deleted in order from the least recently used to the most recently used. As shown in FIG. 13, the cache items are deleted and replaced with the new data items until all of the new items are saved or until all of the items associated with the current cache level have been deleted.

If all of the old items have been deleted from the current cache level (query task 1310), then the client device deletes the least recently used item in the next cache level (task 1314). The process flow is repeated until all of the new data items have been saved in the client cache. In this respect, the existing cache items are deleted selectively according to a hierarchical preference scheme. The preference scheme utilized by the embodiment described herein favors UI form data the most and assigns the lowest preference to old source data. This preference scheme selectively deletes cached items according to the data type, e.g., source data, icon data, form data, or the like.

In response to the updating of the cache, the client device preferably creates a suitable entry in the client "send" queue (task 1316); this entry or command informs the UI server by providing a list of the removed cache items. Thereafter, the UI server can update its shadow cache by deleting the same items (task 1318). In this manner, the shadow cache remains consistent with the client cache and the UI server maintains an accurate inventory of the client data items.

UI Server Processing

Figure 14:
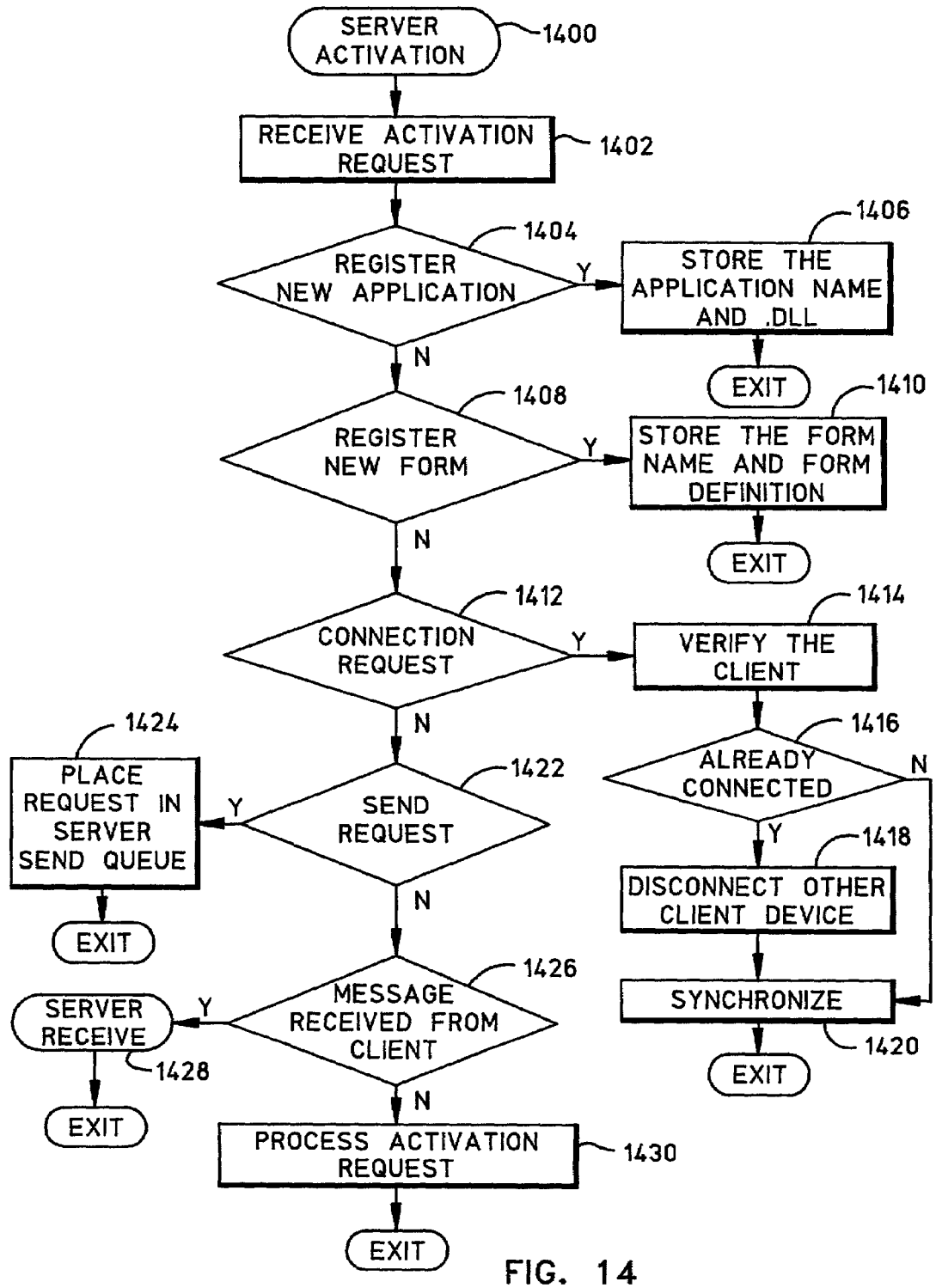
FIG. 14 is a flow chart of a server activation process.

FIG. 14 is a flow chart of a server activation process 1400 that may be performed by a UI server. Process 1400 generally contemplates a number of situations where the UI server is activated, prompted, or otherwise expected to respond. In this regard, process 1400 may begin when the UI server receives a suitable activation request (task 1402). This activation request may be generated internally by the UI server, it may be received from the client device, or it may be received from a system administrator or other "third party" entity.

If the activation request represents a request to register a new server-based application with the UI server (query task 1404), then the UI server may store the name and the executable portion of the application (e.g., a suitable application DLL) in an appropriate memory location (task 1406). Thereafter, the UI server can make this new application available to one or more client devices.

If the activation request represents a request to register a new UI form with the UI server (query task 1408), then the UI server may store the form definition and possibly the form name or identifier in an appropriate memory location (task 1410). New forms may be defined to support new applications or to support newer versions of previously-supported applications.

If the activation request represents a connection request from a client device (query task 1412), then the UI server will attempt to verify the identity of the client device (task 1414). Assuming that the client device is authenticated, the UI server determines whether it is currently connected to another client device operated by the same end user (query task 1416). This situation may arise when a single end user operates more than one client device and connects to the UI server using the different devices. A practical system may limit the number of simultaneous connections to avoid synchronization issues. Thus, if the UI server is already connected to another related client device, it will save the current operating state of the other device before disconnecting it (task 1418). Thereafter, the requesting client device can be connected and synchronized with the UI server (task 1420).

If the activation request represents a request to send a message from a server-based application (query task 1422), then the UI server may format a suitable request or command and place it into the server "send" queue (task 1424). The sending of data from the UI server is described in more detail below in connection with FIG. 15.

If the activation request represents a message, command, data item, or request received from a client device (query task 1426), then the UI server may perform an appropriate server receive procedure 1428. A suitable procedure 1428 is described in more detail below in connection with FIG. 16.

Of course, the UI server may obtain any number of activation request types and those set forth above are not intended to limit the scope of the present invention. In this regard, server activation process 1400 may be configured to process any activation request in an appropriate manner (task 1430).

Figure 15:
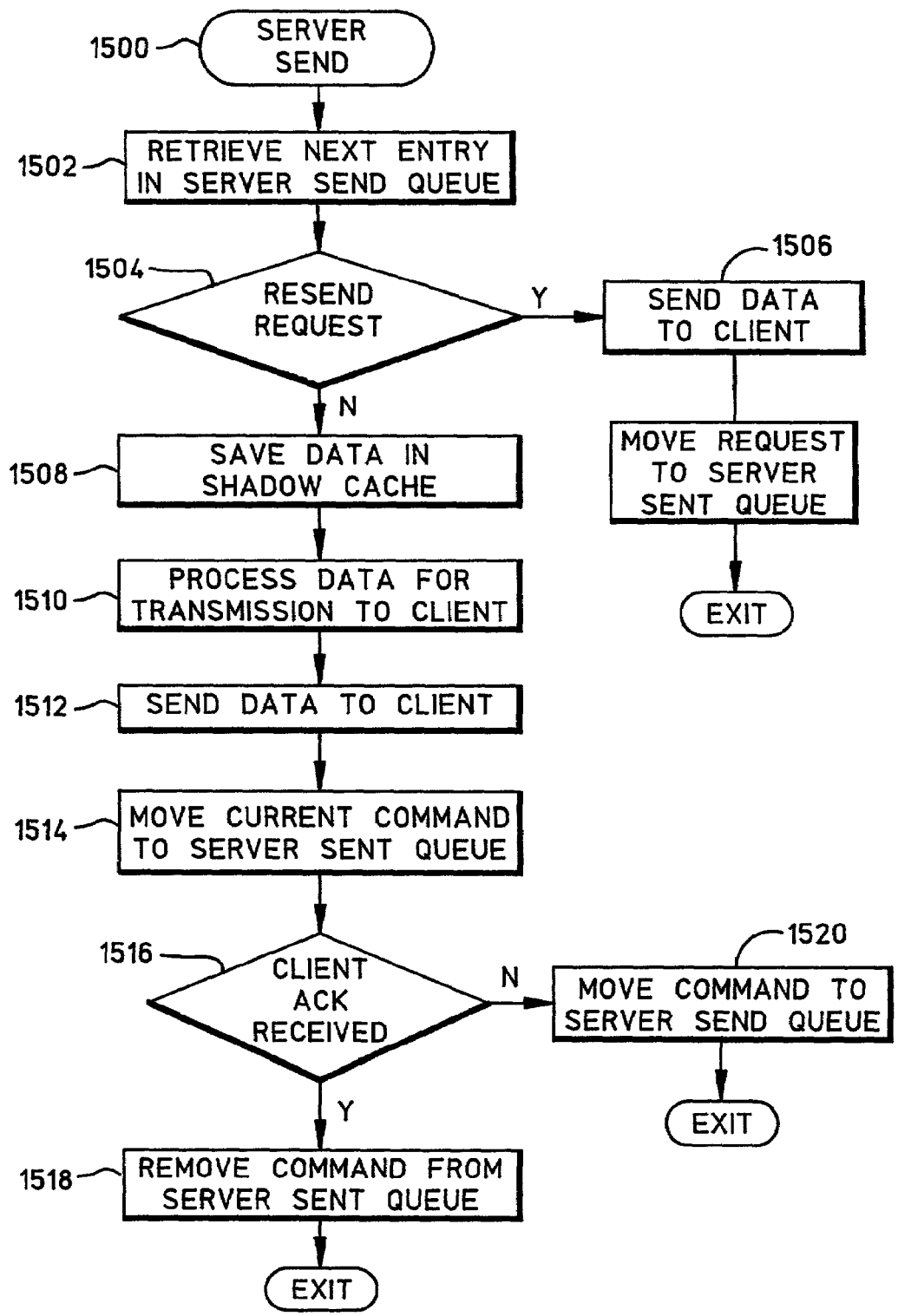
FIG. 15 is a flow chart of a server process for sending data.

FIG. 15 is a flow chart of a server send process 1500 that may be performed by the UI server when sending data to the client device. In practice, process 1500 can be carried out by various elements of the server processing architecture, such as the server send element and the server communication interface element. When ready to send data to the client device, the UI server retrieves the next entry in the server "send" queue for processing (task 1502). If the current entry represents a resend request (query task 1504), then the UI server can immediately send the corresponding data to the client device (task 1506). Thereafter, the resend request can be moved to the server "sent" queue (task 1507). The UI server can resend the data quickly because the server shadow cache already contains the data item (and the data is already properly formatted).

If the current entry does not represent a resend request, then the corresponding data (or some record of or pointer to it) is saved in the server shadow cache (task 1508), which functions as a copy of the client cache. Thus, the UI server regularly maintains the shadow cache, which may include a list of source data items saved locally at the client device and/or a list of data items that have been transmitted from the UI server to the client device. Eventually, the UI server will process the data for transmission to the client device (task 1510). A practical UI server may construct a suitable command for the data by adding meta-information data which could include (but is not limited to) command length, an identifier, and a transmission cookie or token; and performing a number of common data transformations including (but not limited to) data encryption, compression, and adjustments for string types or byte order depending on the client's reported capabilities.

The command including the data is sent to the client via the server communication interface element and the communication network (task 1512). Once sent, the UI server moves the command, or an appropriate identifier for the command, to the server "sent" queue (task 1514). The command preferably remains in the server "sent" queue until its receipt is acknowledged by the client device. Accordingly, the server send process 1500 may monitor a timer to determine whether an acknowledgement is received within a specified time period (query task 1516). If so, then the command may be removed or deleted from the server "sent" queue (task 1518). If the UI server does not receive an acknowledgement within the allotted time limit, then it may move the command back into the server "send" queue (task 1520) so that it can be resent to the client device in due course.

Figure 16:
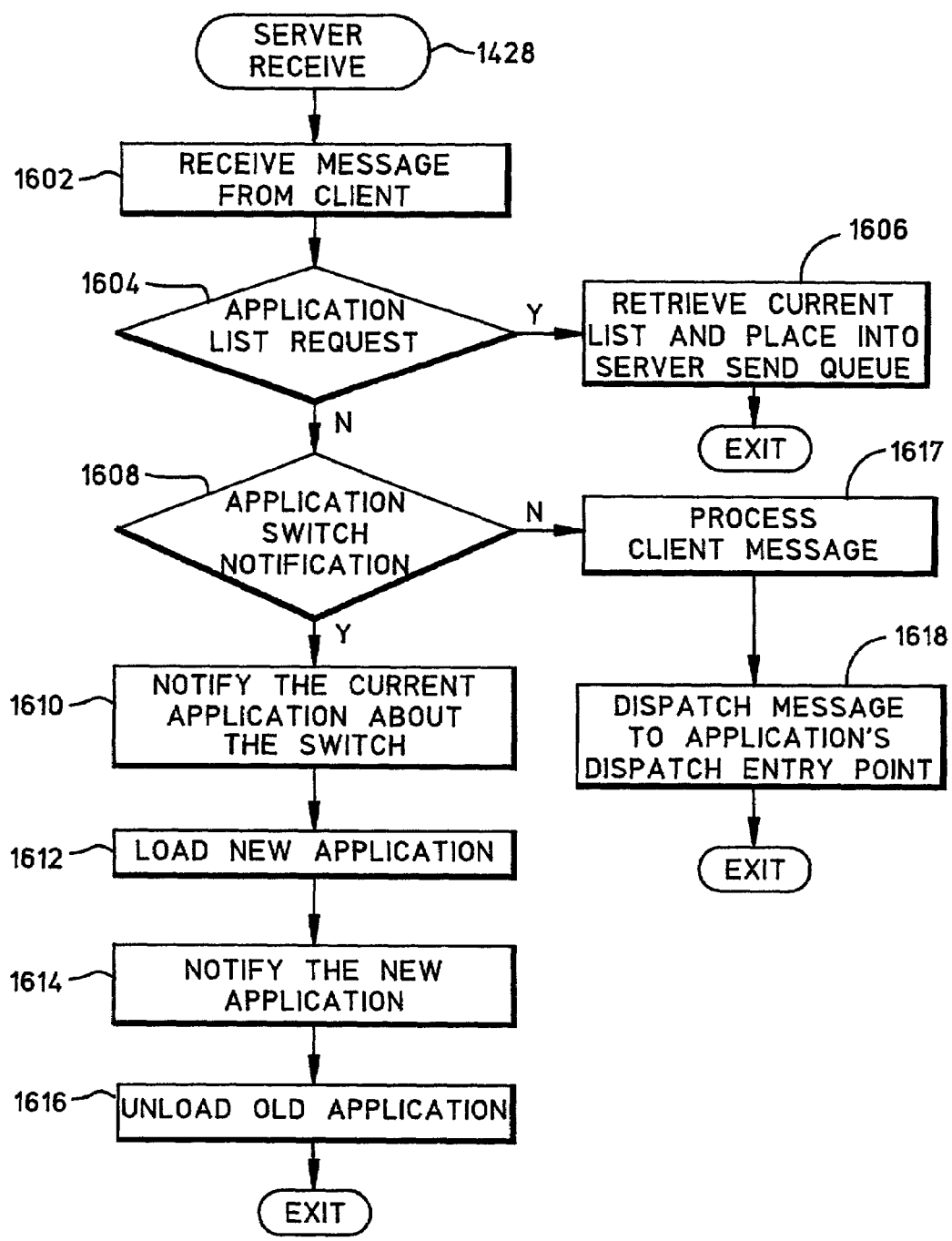
FIG. 16 is a flow chart of a server process for handling received messages.

FIG. 16 is a flow chart of a server receive process 1428 that may be performed by the UI server to handle incoming messages. Process 1428 may be performed in connection with server activation process 1400 (see FIG. 14). Accordingly, process 1428 may begin when the UI server receives a message, a command, or request from the client device (task 1602). If the message represents an application list request, then the UI server will retrieve the current list of server-based applications available to the client device, create an appropriate command for the list, and place the command into the server "send" queue for transmission to the client device (task 1606).

The received message may represent an application switch notification, which is generated by the client device when the end user decides to change from one server-based application to another. If the received message represents an application switch notification (query task 1608), then the UI server may notify the current application that it will be switched out (task 1610). This notification allows the current application to preserve its state and to otherwise prepare for the switch. The UI server will eventually load the new application for execution (task 1612); in a practical embodiment, task 1612 causes the UI server to load the appropriate application DLL. The UI server may then notify the recently loaded application of its current operational status as the current application (task 1614). In addition, the old application is unloaded or otherwise placed in an idle state (task 1616).

If the received message is neither an application list request nor an application switch notification, then the UI server may process the client message in an appropriate manner (task 1617). In this respect, the UI server may obtain any number of client messages and those set forth above are not intended to limit the scope of the present invention. For example, a client message can be a command generated by the client device following the script attached to a control, a notice that a button control was activated, a request for more data to allow the user to scroll down in a listview, or data associated with the activation of a "save" button. The UI server may then dispatch the message to the dispatch entry point of the current application (task 1618). In this manner, the current application can handle the message in a suitable manner.

Figure 17:
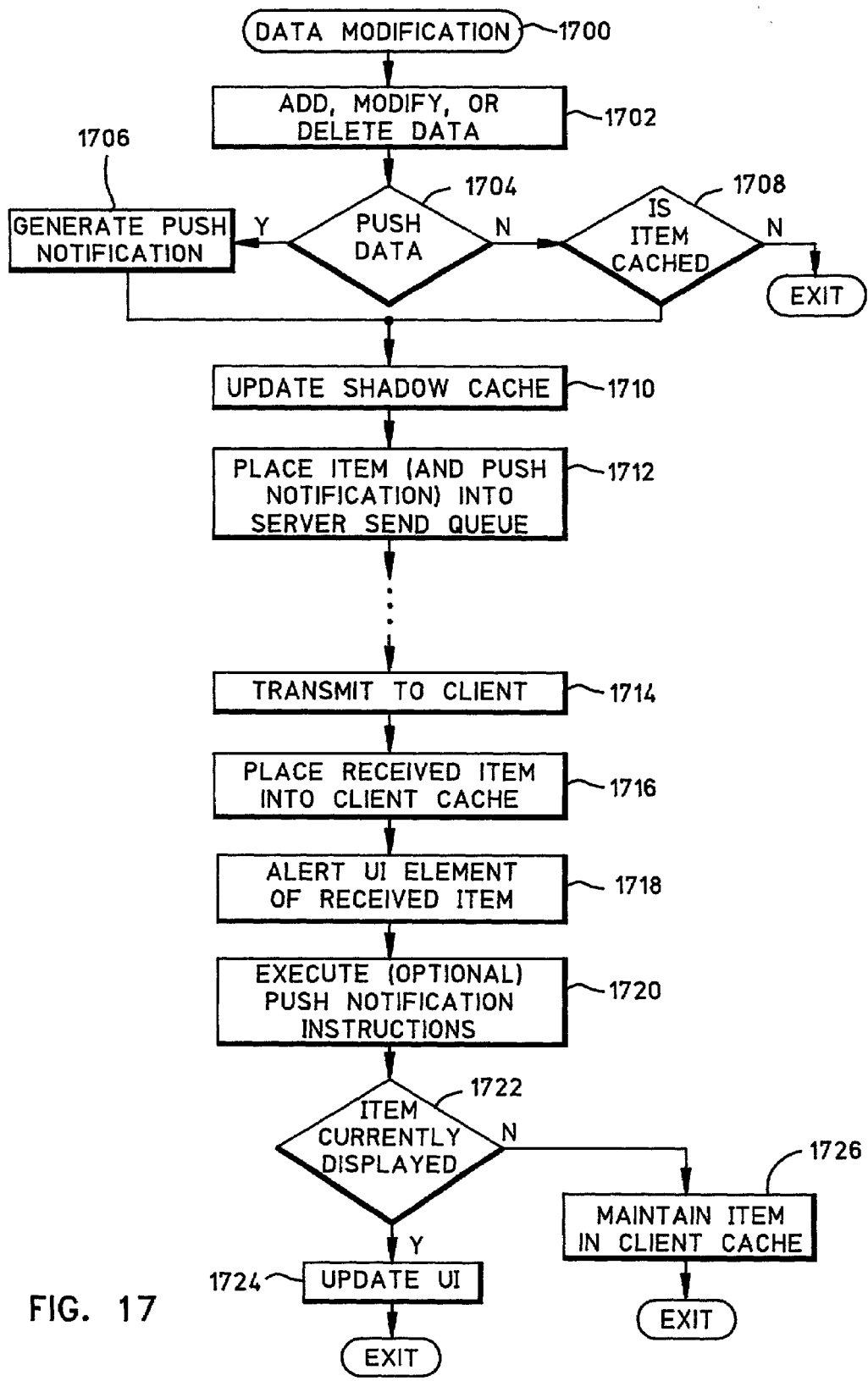
FIG. 17 is a flow chart of a process for handling data modifications.

FIG. 17 is a flow chart of a process for handling data modifications, where such modifications originate at the data source. The data modification process 1700 may begin if an external source adds, modifies, or deletes data associated with one or more of the applications (task 1702). For convenience, the term "modified data" refers to new data, modified data, or deleted data, i.e., "modified data" may represent any change in the status of the source data items for any given application. If the modified data is "push" data, i.e., data, such as new email, that is important enough to alert the user to changes made by others, even if the user is not currently examining that type of data (query task 1704), then the UI server may generate push notification instructions for transmission to the client device (task 1706). If the modified data is not "push" data, then the UI server may test whether the modified data is associated with a data item that is already cached at the client (query task 1708). For example, the modified data may be an updated version of a cached data item. In this regard, the UI server may poll its shadow cache to determine the current status of the client cache. If the modified data item is not cached at the client, then data modification process 1700 exits (this modified data item will be maintained by the UI server until the client device calls the respective application or until the data item is modified again).

If the modified data item is associated with a cached data item, or if the modified data item is a "push" data type, then the UI server updates its shadow cache to reflect the modification (task 1710). If new data is involved, then it is added to the shadow cache; if altered data is involved, then the old version is replaced with the new version. Thereafter, the modified data item (and the push notification instructions, if applicable) is formatted and placed into the server "send" queue (task 1712). Eventually, the UI server will transmit it to the client device (task 1714). Notably, there may be a variable time delay before the modified data is transmitted to the client device. Indeed, the client device may be disconnected from the UI server during this time.

After receiving the modified data item from the UI server, the client receive element places the data item into the client cache (task 1716). The preferred embodiment employs a cache management algorithm, such as the process described above in connection with FIG. 13, when saving data to the client cache. The client receive element may also alert or notify the client UI module to enable the client device to handle the modified data in an appropriate manner (task 1718). When applicable, the client UI module executes the optional push notification instructions (task 1720), which may serve to inform the user that "push" data has arrived. For example, the UI module may generate and display a pop-up window or play an audio tone at the client device.

If the received data item (or an associated list to which the data item belongs) is currently being displayed at the client device (query task 1722), then the client device proceeds to update the UI form and display to accommodate the modified data item (task 1724). Otherwise, the modified data item may be preserved in the client cache until it is requested, deleted, or further modified (task 1726).

Client Device Processing

Figure 18:
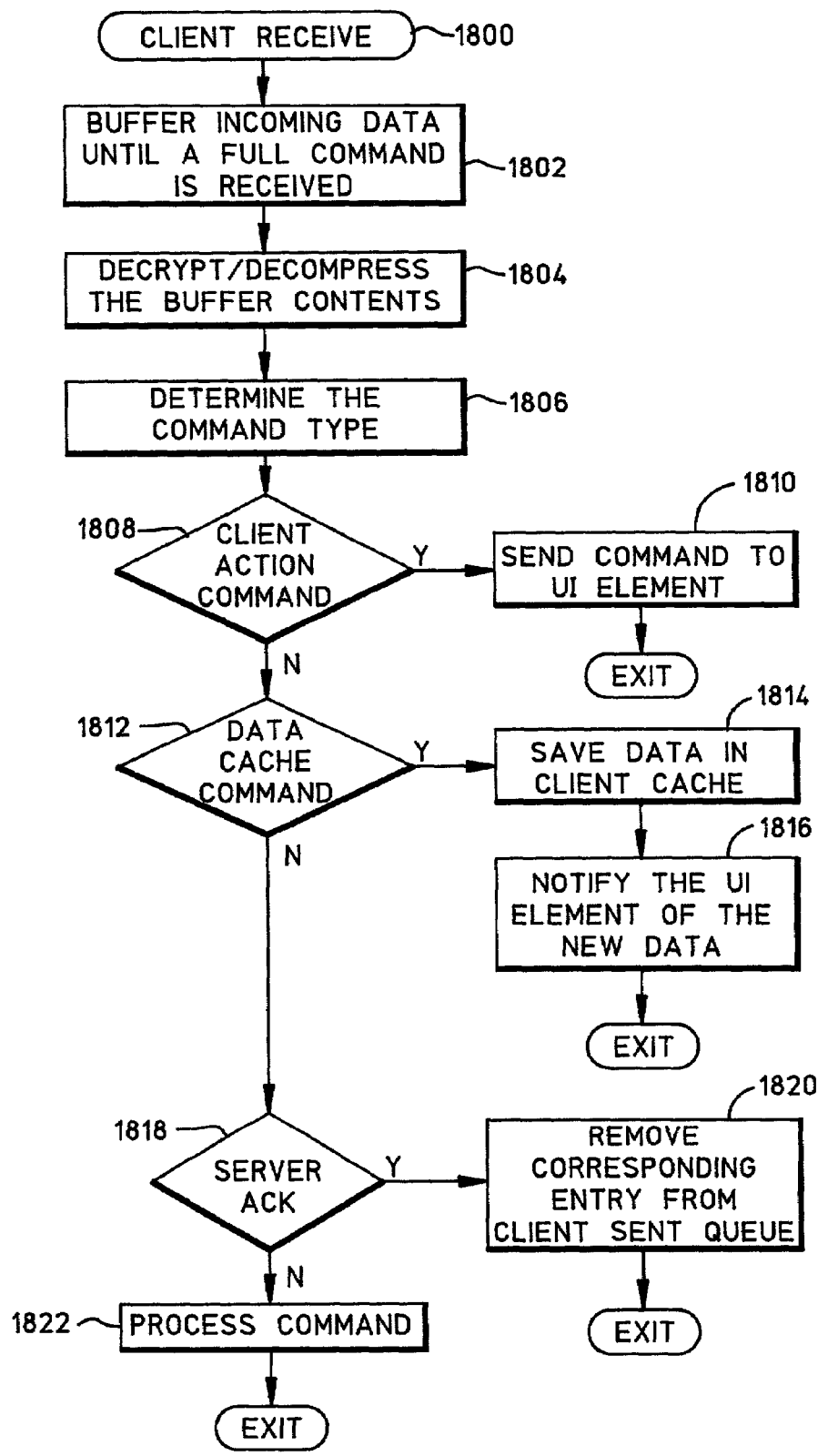
FIG. 18 is a flow chart of a client process for handling received data.

FIG. 18 is a flow chart of a client receive process 1800 that may be performed by a client device when handling received data. Process 1800 may begin when the client device receives a message, a request, or a command from the UI server. In the preferred practical embodiment, the client device places the incoming data into a temporary buffer until a full command has been received (task 1802). Thereafter, the client device may perform any necessary data decryption or decompression on the buffer contents (task 1804). Different command types may be handled differently by the client device. Consequently, the client device may initially analyze the command to determine the command type (task 1806).

If the command represents a client action command (query task 1808), then the command may be sent to the client UI module for further processing (task 1810). In this context, a client action command can be related to the current server-based application. The UI server can generate a client action command when necessary to have the client device perform a particular action, e.g., to display a given UI form, move or modify the attributes of a UI control, or clear the contents of a control. The client device (via, e.g., the UI module) executes the client action command and updates the UI if necessary to reflect any changes that result from the execution of the client action command.

If the command represents a data cache command (query task 1812), e.g., a command that includes a source data item or other data object, then the data is stored in the client cache as specified by the command (task 1814). For example, the command may specify an identifier that refers to the data contents, provide a data type, and specify the cache level in which the data should be stored. Once saved in the client cache, the UI module is notified of the arrival of the data (task 1816) so that the UI module can handle the data in the proper manner.

If the command represents an acknowledgement of data that was originally sent from the client device (query task 1818), then the client device responds by removing the corresponding entry from the client "sent" queue (task 1820). Thus, the client device need not be concerned about resending the original data item.

If the command represents something other than a client action, a data item, or an acknowledgement, then the client device can process the command if it recognizes its command type (task 1822). In other words, the distributed UI system need not be limited to the processing of the specific commands set forth above. Of course, if the client device does not recognize a received command, message, or request, then it may generate an error message or simply disregard it.

Figure 19:
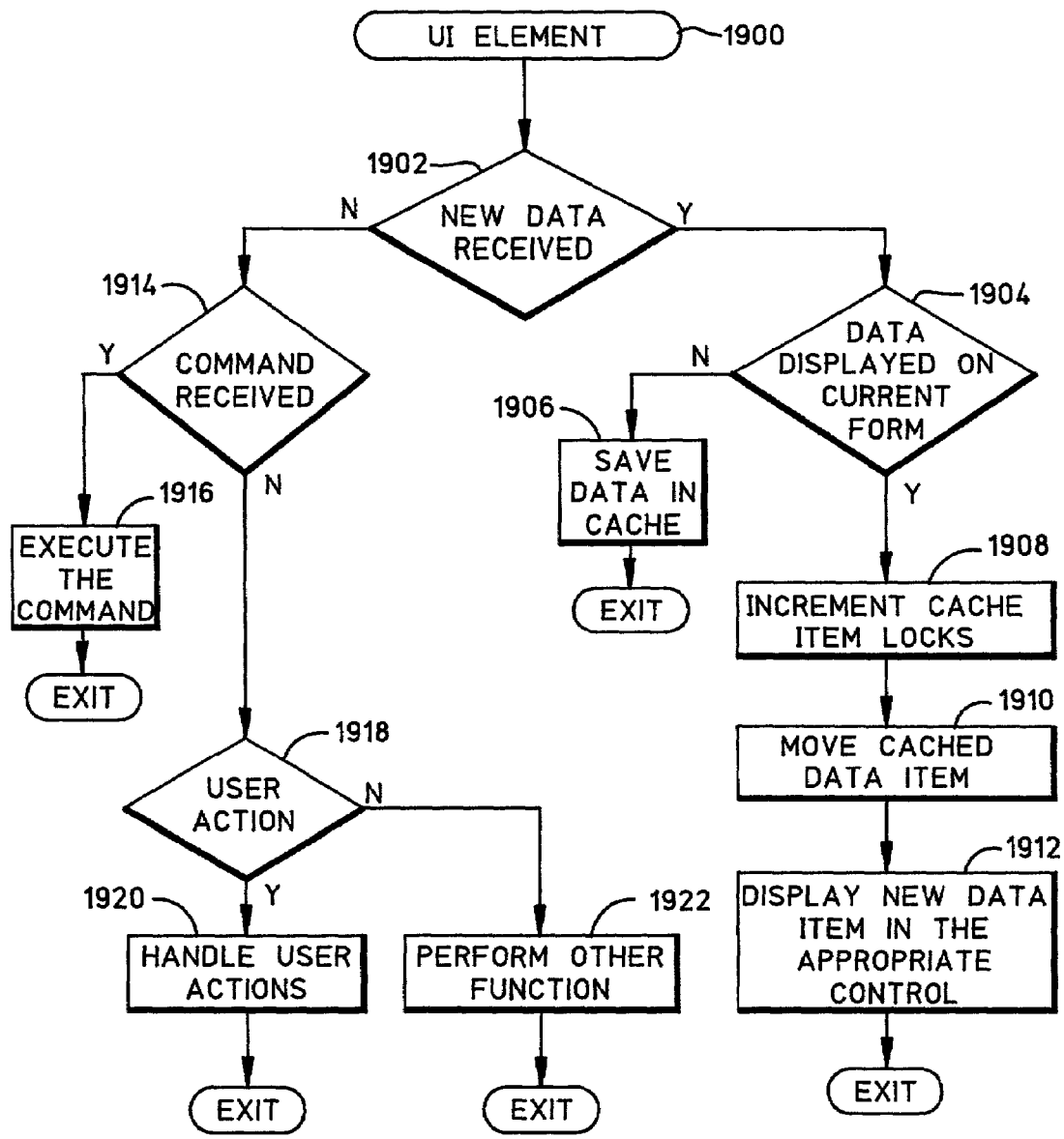
FIG. 19 is a flow chart of a UI element process.

FIG. 19 is a flow chart of a UI element process 1900 that may be performed by the UI module of the client device. As described above in connection with FIG. 18, the client device may direct commands, data, requests, or messages to the UI module for processing in the context of the current UI. The UI module becomes active whenever alerted by the receive element or when the user performs certain actions on the UI. For example, if the UI module receives a data item (query task 1902), then the UI module may initially check whether the received data item (or a different version of it) is already displayed on the current UI form (query task 1904). If not, then the received data item is saved in the client cache (task 1906), where it will reside until called by the client device, deleted, or modified.

If query task 1904 determines that the received data item (or a different version of it) is displayed on the current UI form, then the UI module increments or activates a lock on the new data item to prevent it from being deleted while it is being used (task 1908). If the received data item is intended to replace an old item, the lock on the old item can be decremented to allow the old item to be removed from the cache. The newly cached data item is moved (or suitably marked) to the end of its respective cache level (see FIG. 8 and corresponding description) to make it less susceptible to deletion (task 1910). Eventually, the received data item is displayed in the respective UI control on the current UI form (task 1912).

If the UI module receives a command (query task 1914), e.g., a client action command, a server command, or the like, then the UI module executes the command (task 1916). These UI commands may represent a request to switch UI forms, a request to move UI controls, and other requests related to UI display functions or UI operations.

If the UI module receives a command, request, or message in response to end user manipulation or interaction with the current UI form (query task 1918), then the UI module may handle such user actions (task 1920) as described in more detail below in connection with FIGS. 21–23. Of course, UI element process 1900 may be suitably modified such that the UI module can handle other functions, commands, requests, or messages (task 1922).

Figure 20:
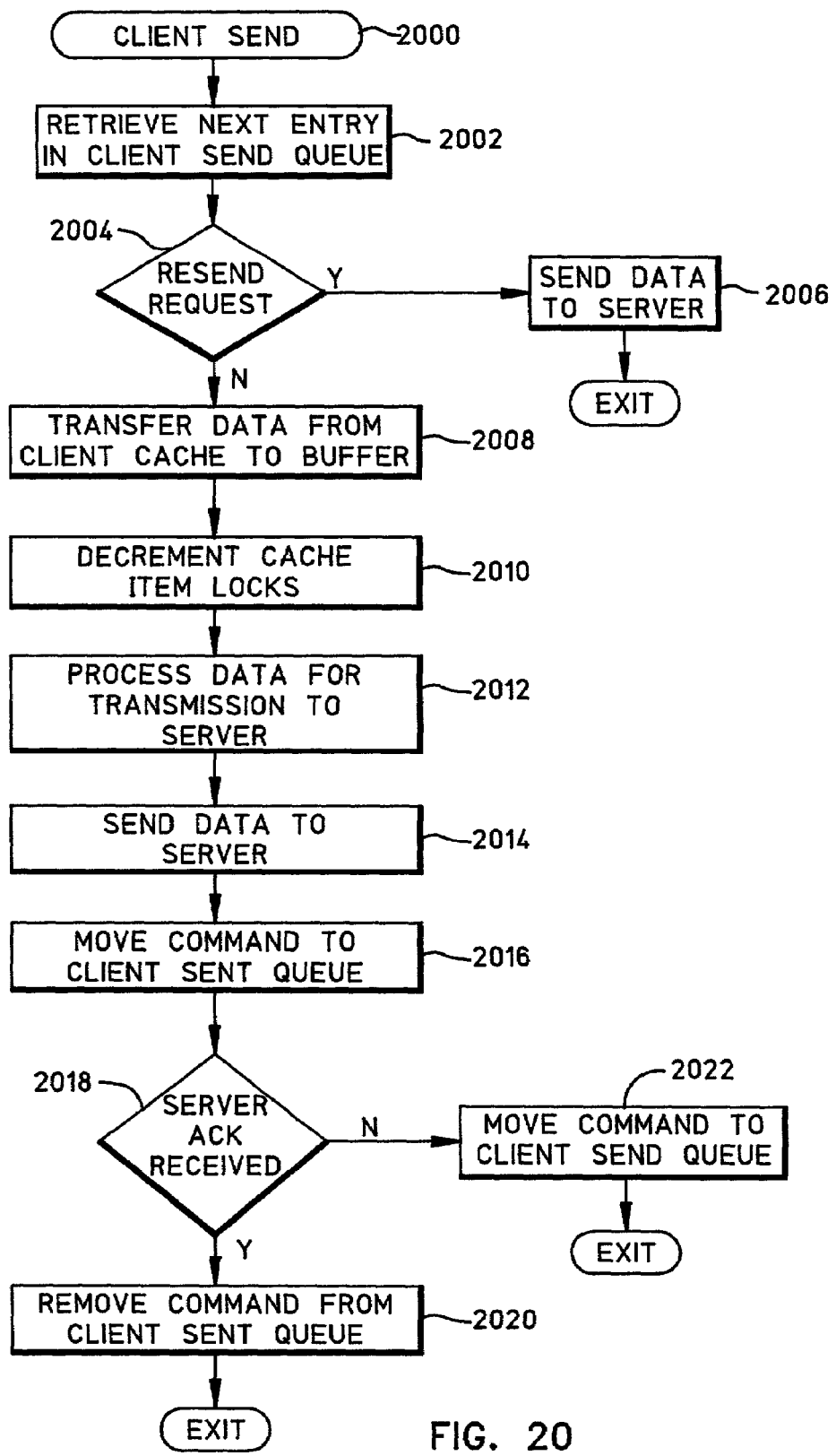
FIG. 20 is a flow chart of a client process for sending data.

FIG. 20 is a flow chart of a client send process 2000 that may be performed by the client device when sending information to the UI server. The client send element, the client communication interface, and other client device elements may cooperate to perform process 2000. When ready to send data to the UI server, the client device retrieves the next entry in the client "send" queue for processing (task 2002). If the current entry represents a resend request (query task 2004), then the client device can immediately send the corresponding data to the UI server (task 2006) without having to perform any additional cache maintenance procedures.

If the current entry does not represent a resend request, then the corresponding data is transferred from the client cache to a temporary buffer (task 2008). This allows the client device to move sent data out of the cache and to have it formatted in one place. (Alternatively, the sent data can be locked in the cache so that the client device does not discard it until it receives an acknowledgement from the UI server. In addition, the cache item locks are decremented or deactivated to allow the items to be deleted by the client device (task 2010). Eventually, the client device processes the data for transmission to the UI server (task 2012). As described above in connection with the server send process 1500, the processing performed during task 2012 may relate to the construction of a suitable command for the data (the command may include the command length, an identifier, and a transmission cookie or token), performing data encryption, and performing data compression.

The command including the data is sent to the UI server via the client communication interface element and the communication network (task 2014). Once sent, the client device moves the command, or an appropriate identifier for the command, to the client "sent" queue (task 2016). The command preferably remains in the server "sent" queue until its receipt is acknowledged by the client device. For example, if the client device receives an acknowledgement from the UI server within a specified time period (query task 2018), then the command may be removed or deleted from the client "sent" queue (task 2020). If the client device does not receive an acknowledgement within the allotted time limit, then it may move the command back into the client "send" queue so that it can be resent to the UI server in due course (task 2022).

Figure 21:
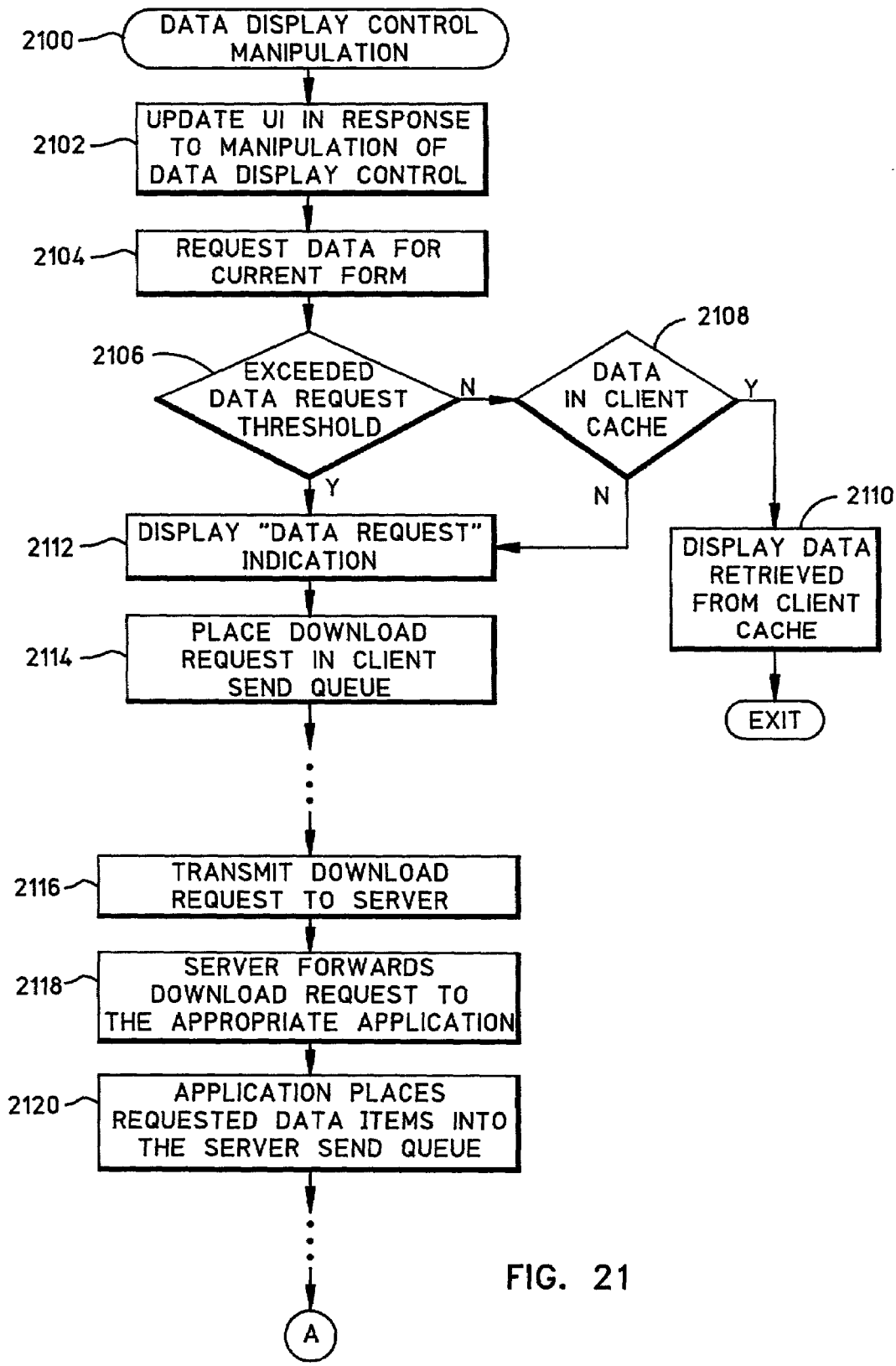
FIG. 21 is a flow chart of a client process for handling a data display control manipulation.
Figure 22:
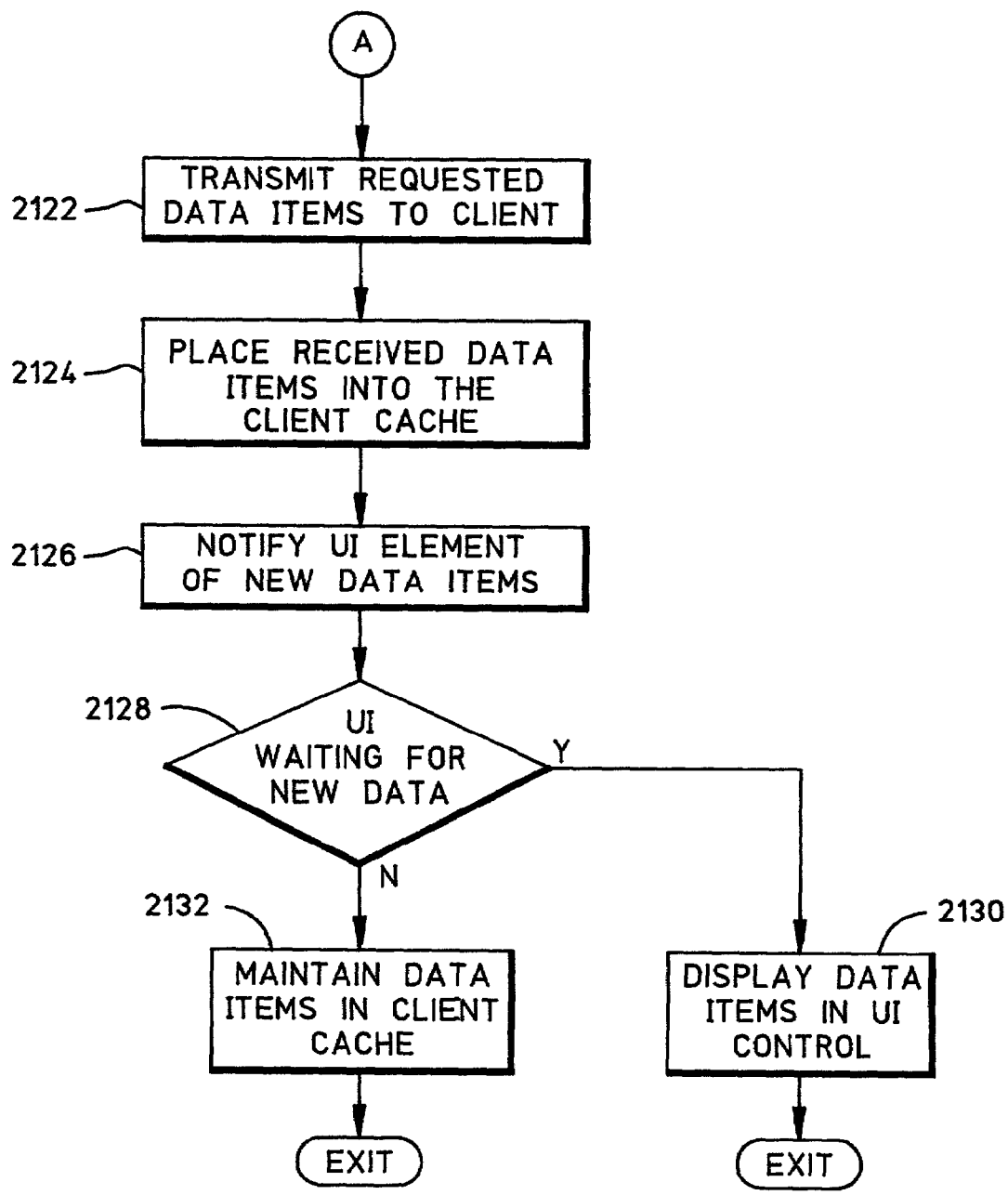
FIG. 22 is a continuation of the flow chart shown in FIG. 21.

FIGS. 21 and 22 illustrate a flow chart of a client process 2100 for handling the manipulation of a data display control at the UI. Such manipulation may occur when the end user interacts with the UI. Thus, a display control manipulation represents a change or modification of UI display features such as the movement of a scrollbar, the placement of icons on a display, the double-clicking on a particular message, and whenever the end user indirectly requests source data items associated with the current server-based application. Thus, process 2100 may begin by updating one or more features of the UI display (e.g., a UI form, a number of UI controls, icon appearance, or the like) in response to the end user manipulation of a UI display control generated by the client device (task 2102).

Usually, the manipulation of a UI display control will result in the display of additional data items. In other words, the current UI form will likely need to be populated with more data items. Accordingly, the client device initiates the retrieval of data items for display in the current UI form by making an appropriate request (task 2104). The client device may employ a "look ahead" technique that requests additional data from the UI server before the client device actually needs the data. For example, process 2100 may test whether a data request threshold has been exceeded (query task 2106). If this threshold has not been exceeded, then the client device may interrogate its cache to determine whether the requested data items are saved locally in the client cache (query task 2108). If the requested data items are present in the client cache, then the UI module can retrieve the data items locally from the cache and display them in the UI form (task 2110). However, if the necessary data items are not cached, then the client device will request them from the UI server.

If the look ahead threshold has been met (or if the requested data is not contained in the client cache), then the client device may update the UI display to indicate that additional data has been requested (task 2112). Such a notification informs the end user and serves as a placeholder while the data is being downloaded from the UI server. For example, the client device may display text such as "Data Requested" in an appropriate UI control field.

In response to the need for additional data, the client device places a download request in the client "send" queue (task 2114). In this regard, the client device can request an additional number of source data items from the UI server if the user's manipulation of the display control triggers a data request command or otherwise exceeds a data downloading threshold. Thereafter, a variable time period may elapse, during which the client device may be disconnected from the UI server. Eventually, whether immediately after being placed in the client "send" queue or after the client re-establishes a connection with the UI server, the download request (or a suitably configured command or message) is transmitted to the UI server (task 2116). Assuming that the transmission is successful, the UI server will receive the download request and forward it to the appropriate server-based application (task 2118). This application handles the data request and places the requested data items (or a suitably configured command or message) into the server "send" queue for transmission back to the client device (task 2120).

The requested data items may wait in the server "send" queue for an indefinite period of time, which may include a disconnected period, before they are transmitted to the client device (task 2122; flow chart continued in FIG. 22). Assuming that the download is successful, the client receive element receives the data items and places them into the client cache (task 2124) according to the data type and according to the cache priority or preference scheme (as described above). In addition, the client receive module may notify the client UI module of the availability of the newly downloaded data items (task 2126). If the UI module is waiting for or displaying the data items (query task 2128), then the UI module retrieves the data for display in the corresponding UI control or form (task 2130). This situation may occur if, for example, the current UI form is waiting to be populated with the new source data items. In contrast, if the UI module has no immediate need for the new data items, then those data items may be maintained in the client cache until requested by the client device, deleted, or subsequently modified (task 2132). Of course, as described above, the client cache is preferably managed such that existing source data items in the client cache can be replaced with new data items if necessary.

Figure 23:
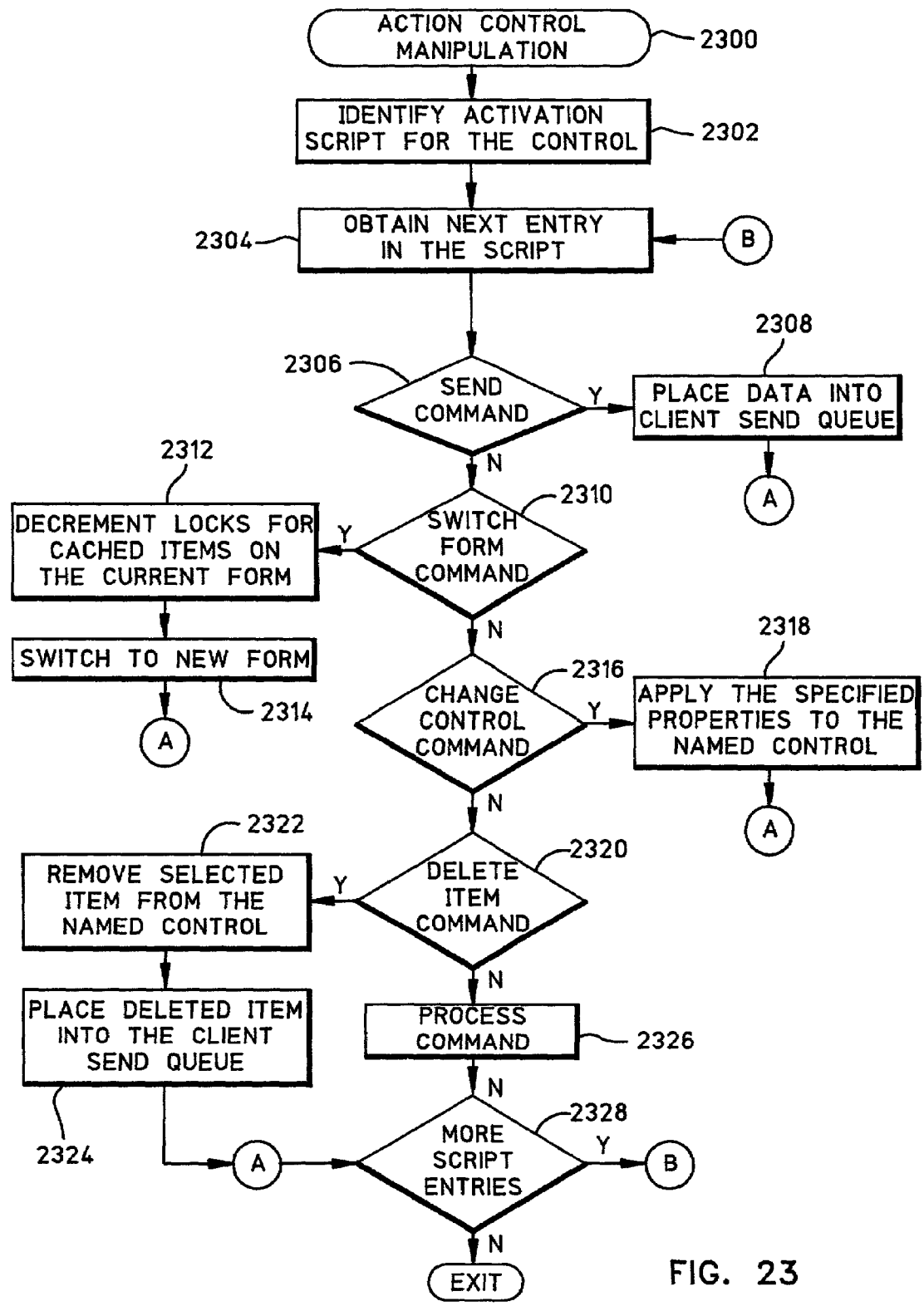
FIG. 23 is a flow chart of a client process for handling an action control manipulation.

FIG. 23 is a flow chart of a process 2300 for handling the manipulation of an action control at the client device. In this context, an action control is a UI control manipulated by the user that results in the application performing an action, as opposed to updating the data displayed in the control. Typical action controls include menus and buttons, but also include data-displaying controls that have been "activated" to perform some duty, such as a double-click on an entry in a listview. Action controls result in actions such as the deletion of data items, the sending of data items, the switching of applications, or the closing of UI forms. In a practical deployment, action controls can be associated with particular UI function buttons, e.g., a "Delete" button, a "Send Message" button, or the like.

Process 2300 may begin with the identification of an activation script corresponding to the activated action control (task 2302). As described above, the client device may utilize any number of command scripts to facilitate efficient client-side processing without much UI server involvement. Once the appropriate command script is identified, it can be executed by retrieving and processing each entry in the script. Accordingly, process 2300 obtains the next entry in the command script (task 2304) so that the UI module can process the command.

If the current entry represents a "send data" command (query task 2306), then the user-entered data from the enumerated UI control(s) is formatted for delivery and placed into the client "send" queue (task 2308). Thereafter, process flow may proceed to a query task 2328 such that the next command entry can be processed. In time, the user-entered data is sent by the client send element to the UI server as described in more detail herein.

If the current entry represents a "switch form" command (query task 2310), then the client device proceeds to exit from the current UI form and display a new UI form. A client device can switch between any number of UI forms utilized by a single application. In addition, the switching of UI forms may correspond to a change in the current server-based application. When switching forms, a practical embodiment may first decrement or deactivate the locks on the cached data items associated with the current UI form (task 2312). As described above, when a UI form is active or displayed, the respective data items are locked in the cache to prevent them from being deleted. Eventually, the client device switches from the old UI form to the new UI form (task 2314). In connection with the switching of forms, the client device may execute a number of additional steps, e.g., an "exit form" script that allows state and/or data to be saved regardless of how the user switches to another form. The client UI module can then populate the new UI form with the necessary data items for display to the end user. Thereafter, process flow leads to query task 2328.

If the current entry represents a "change control" command (query task 2316), then the client device can apply the specified properties to the named UI control (task 2318). Such a command may be generated when a control is moved, resized, hidden, displayed, disabled, cleared, or the like. In this respect, the client UI module may retrieve a UI control definition associated with the named UI control, apply the specified properties, and render the named UI control on the display. Typical UI control properties include the size, position, visibility, and labeling. Following task 2318, the process flow proceeds to query task 2328.

If the current command represents a "delete item" command (query task 2320), then the client device updates the UI in an appropriate manner. The end user can originate a "delete item" command at different points within a UI form, e.g., from a listview control, from a message view, or from a folder tree view. As described in more detail above, the client cache may be modified if the deleted item was originally saved in the cache. In response to a "delete item" command, the client device may remove the identified or selected item from the respective control, e.g., a list control (task 2322). In addition, the deleted item and/or a suitable identifier for that item is formatted for delivery and placed into the client "send" queue (task 2324). In time, the deleted item (and/or its identifier) is sent to the UI server, which preferably updates its shadow cache to accurately reflect the current status of the client cache. Following task 2324, process flow leads to query task 2328.

The client device can be suitably configured to handle other commands (if necessary) in an appropriate manner (task 2326). In other words, the client device need not be limited to the processing of the command types that are specifically described herein. After the current command entry has been handled, the client device determines whether more command entries remain (query task 2328). If not, then process 2300 exits. Otherwise, process 2300 can be re-entered at task 2304, which retrieves the next command entry in the script. In this manner, each command entry is processed until the client device processes the entire script representing the current action control.

Summary of System Functionality

FIG. 24 is a schematic representation of a distributed UI system 2400; FIG. 24 illustrates several of the operating features of the system 2400. The features and elements shown in FIG. 24 may be equivalent to certain features and elements described above in connection with FIG. 7. Indeed, both FIG. 7 and FIG. 24 can represent the same system. FIG. 24 is presented for purposes of a brief summary of the techniques described in detail above.

A client device 2402 communicates with a UI server 2404 via a suitable network 2406 such as the Internet. The client device 2402 includes a display element 2408 and a user entry element 2410 (e.g., a pointing device such as a mouse or a trackball, a keyboard, a keypad, a touchscreen, or the like). In operation, the client device 2402 renders a user interface 2412 on display element 2408. The user interface 2412 can be manipulated by the end user via user entry element 2410. For example, the end user can establish a connection with the UI server 2404, enter login data, launch and terminate server-based applications, switch between server-based applications, manipulate action controls rendered on the user interface 2412, manipulate display controls rendered on the user interface 2412, enter and edit data items associated with the user interface 2412, and perform other operations via the user interface 2412.

The UI server 2404 obtains the device capabilities 2414 for the client device 2402, preferably from the client device 2402 itself, from a third party entity or process, or internally in the form of a preloaded database. The device capabilities 2414 represent characteristics or parameters of the client device 2402 that can impact, restrict, or otherwise have a bearing on the format or configuration of the user interface 2412. The UI server 2404 performs UI formatting 2416 to format and configure different UI form definitions 2418 for use by the client device 2402. The specific form definitions 2418 are based upon or otherwise determined by the client device capabilities 2414 and any number of server-based applications 2420 accessible to the client device 2402 (the server-based applications 2420 are configured to process and manipulate source data items 2422 for presentment to the end user via user interface 2412). The UI server 2404 may provide an applications list 2421 to the user via user interface 2412, thus allowing the user to quickly select a server-based application or switch between applications.

The client device 2402 obtains the UI form definitions 2418 from the UI server 2404 when necessary to render a particular user interface. Any number of UI form definitions 2418 may be stored in a suitably configured client cache element 2426 such that they are available locally to the client device 2402. The client device 2402 (rather than the UI server) performs various UI rendering tasks 2424 to generate and render the user interface 2412 on the display element 2408. In this respect, the UI rendering tasks 2424 retrieve the appropriate UI form definition 2418 from the cache element 2426, format and arrange the various UI elements associated with that form definition, and incorporate any number of native UI controls, labels, or icons 2428 (such native UI features are associated with the client device OS). The UI rendering tasks 2424 may also incorporate any number of "custom" UI elements or features into the current user interface 2412, particularly when suitable native UI features are not available.

Although the client device 2402 performs the UI rendering tasks 2424, the source data items 2422 are obtained from the UI server 2404. In this respect, the UI server 2404 performs various data management tasks 2430 associated with the processing and handling of the source data items 2422 for the server-based applications 2420. For example, the data management tasks 2430 may be associated with data send and receive processes, data retrieval processes, data placement in the UI controls, and the like.

In response to a client request for data, the data management tasks 2430 may retrieve a number of source data items 2422 for downloading to the client device 2402. The client device saves the downloaded data items in a suitable cache element 2432 and populates the various UI controls in user interface 2412 with one or more of the data items. Due to practical storage space limitations, the client device 2402 may perform various cache management tasks 2434 associated with the UI forms cache element 2426 and/or the data cache element 2432. In the preferred embodiment, the cache management tasks 2434 request additional source data items when necessary, selectively remove cached items when free space is needed, update the caches so that they remain synchronized with the current state of the server-based applications, and perform other processes as described above.

At the server side, the data management tasks 2430 (and/or the applications 2420) may also be responsible for updating a shadow cache 2436 maintained by the UI server 2404. The shadow cache 2436 preferably contains copies of or references to data (e.g., source data items, form definitions, and the like) that have been cached by the client device 2402. The shadow cache 2436 allows the UI server 2404 to monitor the current status of the client device 2402 and to manage the transfer of data in an efficient and effective manner.

A distributed UI system can employ these preferred features and operations to provide graphical user interfaces for any number of server-based applications in a manner that conserves transmission bandwidth. Furthermore, the distributed UI system need not be restricted to use with client devices having a large amount of processing power and/or a large data storage capacity. Consequently, a relatively small handheld wireless client device can utilize the techniques of the present invention while accessing server-based applications.

The present invention has been described above with reference to a preferred embodiment. However, those skilled in the art having read this disclosure will recognize that changes and modifications may be made to the preferred embodiment without departing from the scope of the present invention. These and other changes or modifications are intended to be included within the scope of the present invention, as expressed in the following claims.

What is claimed is:

1. A data processing method comprising:
   executing, at a user interface (UI) server, a server-based application configured to process source data items;
   retrieving a UI form definition stored at said UI server, said UI form definition specifying characteristics of a UI form for said server-based application and said UI form definition corresponding to a platform of a particular client device wherein said UI form definition is selected from a plurality of UI form definitions stored at said UI server corresponding to a plurality of client platforms, and wherein a cached copy of the UI form definition is saved on said client device;
   instructing said client device to render a particular UI form of a client-resident intermediate UI corresponding to said UI form definition, including instructing the client device to supplement a skeletal UI stored in a first memory location with one or more icons, labels or menu items, or combinations thereof, stored in a second memory location;
   transmitting, from said UI server, a number of source data items for population in said UI form, said number of source data items being related to said server-based application;
   receiving a command from said client device, said command being indicative of an offline action performed by said client device; and
   said UI server processing said command for execution by said server-based application.

2. A method according to claim 1, further comprising the step of generating said UI form definition based upon a number of device capabilities for said client device.

3. A method according to claim 2, further comprising the step of receiving, at said UI server, data representing said number of device capabilities.

4. A method according to claim 2, wherein said generating step generates said UI form based upon at least one native UI control stored locally at said client device.

5. A method according to claim 4, wherein said at least one native UI control is associated with an operating system for said client device.

6. A method according to claim 1, further comprising the steps of:
   receiving an action request representing a manipulation of said UI form by a user of said client device; and
   subsequently instructing said client device to render a new UI form in response to said action request.

7. A method according to claim 1, further comprising the steps of:
   receiving an action request representing a manipulation of said UI form by a user of said client device; and
   subsequently instructing said client device to update said UI form in response to said action request.

8. A method according to claim 1, further comprising the step of maintaining a shadow cache at said UI server, said shadow cache including data indicative of source data items associated with said client device.

9. A method according to claim 8, further comprising the steps of:
   said UI server receiving information representing new, deleted, or modified source data items; and
   said UI server updating said shadow cache to reflect said new, deleted, or modified source data items.

10. A method according to claim 8, wherein said shadow cache includes a list of source data items transmitted from said UI server to said client device.

11. A method according to claim 8, wherein said shadow cache includes a list of source data items saved locally by said client device.

12. A method according to claim 1, wherein said transmitting step is performed in response to a manipulation of said UI form.

13. A method according to claim 1, wherein said retrieving step is performed by said UI server in response to a device identifier received from said client device.

14. A method according to claim 1, wherein:
   said UI server has access to a total number of source data items associated with said UI form; and
   said transmitting step initially transmits a first portion of said total number of source data items to said client device.

15. A method according to claim 14, further comprising the steps of:
   said UI server subsequently receiving a request for additional source data items; and
   said UI server transmitting a subsequent portion of said total number of source data items to said client device in response to said request.

16. A method according to claim 15, wherein said UI server receives said request from said client device in response to a manipulation of said UI form.

17. A method according to claim 1, further comprising the steps of:
   said UI server receiving information representing new, deleted, or modified source data items; and said UI server transmitting, to said client device, push data representing said new, deleted, or modified source data items.

18. A method according to claim 17, further comprising the step of said UI server sending, to said client device, a push notification corresponding to said push data.

19. A data processing method comprising:
receiving, at a user interface (UI) server, a number of device capabilities for a client device;
generating a UI form definition based upon said number of device capabilities, said UI form definition specifying characteristics of a UI form for a server-based application maintained by said UI server;
said UI server transmitting data indicative of said UI form definition to said client device, wherein a cached copy of the UI form definition is then saved on said client device; and
said UI server sending a number of source data items to said client device, said number of source data items being related to said UI form, and
wherein said number of source data items comprises a smaller subset than a total number of source data items related to said server-based application, and wherein further subsets of said total number of source data items are downloadable based upon execution of one or more client-side controls.

20. A method according to claim 19, further comprising the step of specifying a command script corresponding to a manipulation of a UI control contained in said UI form, said command script being configured for execution by said client device.

21. A method according to claim 19, further comprising the step of executing said server-based application at said UI server.

22. A method according to claim 19, further comprising the step of storing said UI form definition at said UI server.

23. A method according to claim 19, further comprising the step of instructing said client device to render said UI form.

24. A method according to claim 23, wherein said instructing step identifies said UI form definition.

25. A method according to claim 19, wherein said generating step generates said UI form based upon at least one native UI control stored locally at said client device.

26. A method according to claim 25, wherein said at least one native UI control is associated with an operating system for said client device.

27. A method according to claim 19, further comprising the steps of:
receiving an action request representing a manipulation of said UI form by a user of said client device; and
subsequently instructing said client device to render a new UI form in response to said action request.

28. A method according to claim 19, further comprising the steps of:
receiving an action request representing a manipulation of said UI form by a user of said client device; and
subsequently instructing said client device to update said UI form in response to said action request.

29. A method according to claim 19, further comprising the step of maintaining a shadow cache at said UI server, said shadow cache including source data items associated with said client device.

30. A method according to claim 29, further comprising the steps of:
said UI server receiving information representing new, deleted, or modified source data items; and
said UI server updating said shadow cache to reflect said new, deleted, or modified source data items.

31. A method according to claim 29, wherein said shadow cache includes a list of source data items transmitted from said UI server to said client device.

32. A method according to claim 29, wherein said shadow cache includes a list of source data items saved locally by said client device.

33. A method according to claim 19, wherein:
said UI server has access to a total number of source data items associated with said UI form; and
said sending step initially sends a first portion of said total number of source data items to said client device.

34. A method according to claim 33, further comprising the steps of:
said UI server subsequently receiving a request for additional source data items; and
said UI server sending a second portion of said total number of source data items to said client device in response to said request.

35. A method according to claim 34, wherein said UI server receives said request from said client device in response to a manipulation of said UI form.

36. A data processing method comprising:
receiving a device identifier that identifies a client device;
receiving a request for a server-based application;
transmitting a UI form identifier to said client device in response to said device identifier, said UI form identifier representing at least one UI form definition that corresponds to a number of device capabilities for said client device, said UI form definition being selected from a plurality of UI form definitions corresponding to devices capabilities of a plurality of client devices, and said UI form identifier specifying characteristics of at least one particular form of a client resident intermediate UI for said server-based and client-side controlled application, wherein a cached copy of the at least one UI form definition is saved on said client device, and wherein based on said at least one UI form definition said client device supplements a skeletal UI stored in a first memory location with one or more icons, labels or menu items, or combinations thereof, stored in a second memory location; and
sending a number of source data items to said client device, said number of source data items being configured for display in connection with said at least one UI form.

37. A method according to claim 36, wherein said at least one UI form definition is based upon a number of device capabilities for said client device.

38. A method according to claim 37, further comprising the steps of:
receiving data representing said number of device capabilities; and
generating said at least one UI form definition based upon said number of device capabilities.

39. A method according to claim 38, further comprising the step of storing said at least one UI form definition.

40. A method according to claim 36, wherein said at least one UI form definition specifies at least one native UI control stored locally at said client device.

41. A method according to claim 36, further comprising the step of executing said server-based application in response to said request.

42. A method according to claim 36, wherein said number of source data items represent a portion of a larger amount of related data available at said UI server.

43. A server architecture for use with a user interface (UI) server capable of communicating with a client device, said server architecture comprising:
- a receive module configured to receive a device identifier that identifies a client device, and to receive a request for a server-based application;
- a send module configured to send a UI form identifier to said client device in response to said device identifier, said UI form identifier representing at least one UI form definition that corresponds to a number of device capabilities for said client device, said UI form definition being selected from a plurality of UI form definitions corresponding to devices capabilities of a plurality of client devices, and said UI form identifier specifying characteristics of a UI form for said server-based application, wherein a cached copy of the at least one UI form definition is saved on said client device, and
- a data management module configured to retrieve a number of source data items for display in connection with said UI form, and
- wherein said number of source data items comprises a smaller subset than a total number of source data items related to said server-based application, and wherein further subsets of said total number of source data items are downloadable based upon execution of one or more client-side controls.

44. A server architecture according to claim 43, further comprising an executable module corresponding to said server-based application, said executable module being activated in response to said request.

45. A server architecture according to claim 43, wherein said send module is further configured to send said number of source data items to said client device.

46. A server architecture according to claim 43, further comprising a shadow cache that stores source data items associated with said client device.

47. A server architecture according to claim 46, wherein:
said receive module is further configured to receive information representing new, deleted, or modified source data items; and said data management module is further configured to update said shadow cache to reflect said new, deleted, or modified source data items.

48. A server architecture according to claim 43, wherein:
said data management module has access to a total number of source data items associated with said UI form; and
said send module is further configured to send a first portion of said total number of source data items to said client device.

49. A server architecture according to claim 48, wherein:
said receive module is further configured to receive a second request for additional source data items;
said data management module is further configured to retrieve a second portion of said total number of source data items for display in connection with said UI form; and
said send module is further configured to send said second portion of said total number of source data items to said client device.

50. A server architecture according to claim 49, wherein said receive module receives said second request in response to a manipulation of said UI form.

51. A server architecture according to claim 43, further comprising a UI formatting module configured to generate said UI form definition based upon a number of device capabilities for said client device.

52. A server architecture according to claim 51, wherein said receive module is further configured to receive said number of device capabilities from said client device.

53. A server architecture according to claim 51, wherein said send module is further configured to send said UI form definition to said client device.

54. A server architecture according to claim 51, wherein said UI form definition specifies at least one native UI control stored locally at said client device.

* * * * *